United States Patent Office 3,780,061
Patented Dec. 18, 1973

3,780,061
TRICYCLIC KETONIC COMPOUNDS
Andre Allais, 65 Rue du Garde-Chasse 93, Les Lilas,
France; Lucien Nedelec, 45 Boulevard de l'Ouest 93,
Le Raincy, France; Jacques Guillaume, 42 Avenue de
Savigny 93, Aulnay-sous-Bois, France; and Daniel
Frechet, 45 Rue Lecourbe 75, Paris, France
No Drawing. Filed May 19, 1972, Ser. No. 255,045
Claims priority, application France, May 21, 1971,
18,377
Int. Cl. A61k 27/00; C07d 63/18, 69/76
U.S. Cl. 260—332.2 A
20 Claims

ABSTRACT OF THE DISCLOSURE

Possibly racemic or optically active tricyclic ketonic compounds having the formula

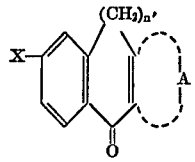

wherein X is hydrogen, halogen or trihalomethyl, $n'$ is 2 or 3 and A represents the remainder of a benzene ring or also, when $n'$ is 2, the remainder of a thiophene ring whose sulfur is α to the carbon atom attached to the ketone carbon atom, said benzene ring or said thiophene ring being substituted in a position β to the carbon atom attached to the ketone carbon atom by an alkanoic substituent having the formula

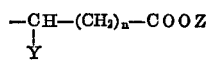

where Y is hydrogen or alkyl having 1 to 3 carbon atoms, $n$ is 0, 1 or 2 and Z is hydrogen, lower alkyl, lower hydroxyalkyl, acetonide of lower hydroxyalkyl, di-lower alkylamino-lower alkyl, N-heterocyclic-aminoalkyl, alkali metal or alkali earth metal, and the process of preparation. These tricyclic ketonic compounds have a clear analgesic action and a remarkable anti-inflammatory action without a secondary ulcerigenic effect.

OBJECTS OF THE INVENTION

An object of the present invention is the preparation of tricyclic ketonic compounds having the formula

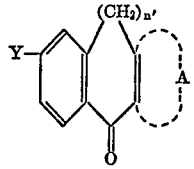

wherein X represents a member selected from the group consisting of hydrogen, halogen and trihalomethyl, $n'$ is an integer from 2 to 3, and A represents the remainder of a ring system selected from the group consisting of benzene, when $n'$ is 2 or 3, and thiophene having its sulfur in position α to the carbon atom attached to the ketone carbon atom, when $n'$ is 2, said remainder of a ring system being substituted in position β to the carbon atom attached to the ketone carbon atom by an alkanoic substituent having the formula

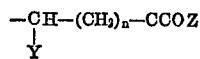

wherein Y represents a member selected from the group consisting of hydrogen and alkyl having 1 to 3 carbon atoms, $n$ is an integer from 0 to 2 and Z represents a member selected from the group consisting of hydrogen, alkali metal, alkali earth metal, aluminum, ammonium, the salt of lower alkylamines, the salt of lower alkanolamines, the salt of glycine, lower alkyl, lower hydroxyalkyl, the acetonide of lower hydroxyalkyl, di-loweralkylamino-lower alkyl and N-heterocyclicamino-lower alkyl.

Another object of the present invention is the development of a process for the preparation of tricyclic ketonic compounds having the formula

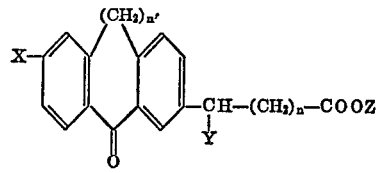

wherein X represents a member selected from the group consisting of hydrogen, halogen and trihalomethyl, $n'$ is an integer from 2 to 3, wherein Y represents a member selected from the group consisting of hydrogen and alkyl having 1 to 3 carbon atoms, $n$ is an integer from 0 to 2 and Z represents a member selected from the group consisting of hydrogen, alkali metal, alkali earth metal, aluminum, ammonium, the salt of lower alkylamines, the salt of lower alkanolamines, the salt of glycine, lower alkyl, lower hydroxyalkyl, the acetonide of lower hydroxyalkyl, di-loweralkylamino-lower alkyl and N-heterocyclic-amino-lower alkyl which comprises, (1) nitrating a compound having the formula

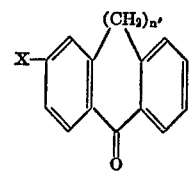

wherein X and $n'$ have the above assigned values, by means of a nitration agent, (2) reducing the resultant nitro compound having the formula

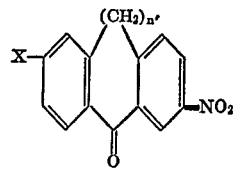

wherein X and $n'$ have the above assigned value, by action of a reducing reactant, (3) effecting a Sandmeyer reaction on the resultant amino compound having the formula

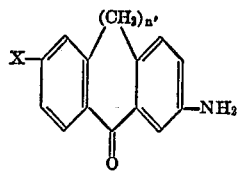

wherein X and $n'$ have the above assigned values, by diazotation and action of a cupric cyano complex, (4) hydrolyzing the resultant cyano compound having the formula

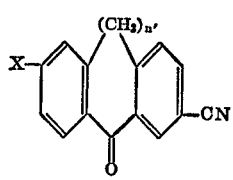

wherein X and n' have the above assigned values, by means of an acid, (5) chain elonging the resultant carboxylic compound having the formula

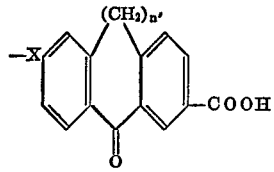

wherein X and n' have the above assigned values, by means of one or more Arndt-Eistert reactions, and (6) recovering said tricyclic ketone compounds.

A yet further object of the present invention is the development of a process for the production of tricyclic ketonic compounds having the formula

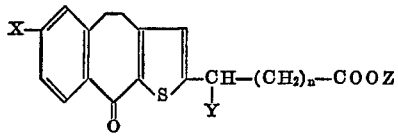

wherein X represents a member selected from the group consisting of hydrogen, halogen, and trihalomethyl, n is an integer from 0 to 2 Y represents a member selected from the group consisting of hydrogen and alkyl having 1 to 3 carbon atoms, and Z represents a member selected from the group consisting of hydrogen, alkali metal, alkali earth metal, aluminum, ammonium, the salt of lower alkylamines, the salt of lower alkanolamines, the salt of glycine, lower alkyl, lower hydroxyalkyl, the acetonide of lower hydroxyalkyl, di-loweralkylamino-lower alkyl and N-heterocyclicamino-lower alkyl, which comprises the steps of (1) reacting a tri-lower alkyl phosphite with 2-lower alkyloxycarbonyl-4-bromomethyl-thiophene, (2) reacting the resultant phosphonate having the formula

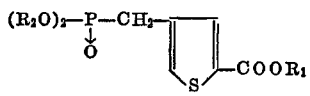

wherein $R_1$ and $R_2$ are lower alkyl, with a benzoic acid having the formula

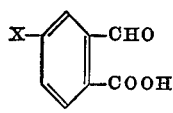

wherein X has the above assigned value, in a basic reaction media, (3) reducing the resultant trans compound having the formula

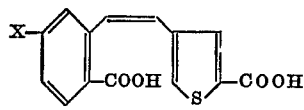

wherein X has the above assigned value, by action of a olefinic reducing agent, (4) cyclizing the resultant ethyl compound having the formula

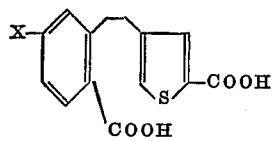

wherein X has the above assigned value, (5) chain elonging the resultant carboxylic compound having the formula

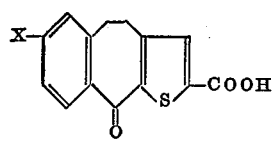

wherein X has the above assigned value, by means of one or more Arndt-Eistert reactions, and (6) recovering said tricyclic ketonic compounds.

A still further object of the present invention is to provide novel intermediates in the above process.

A further object of the present invention is to provide therapeutic compositions and methods of combatting inflammation and effecting analgesia utilizing the above tricyclic ketonic compounds.

These and other objects of the present invention will become more apparent as the description thereof proceeds.

DESCRIPTION OF THE INVENTION

The present invention is directed to novel tricyclic ketonic compounds, possibly racemic or optically active having the General Formula I

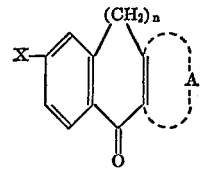

(I)

in which X represents hydrogen, halogen or trihalomethyl, n' represents the numbers 2 or 3 when A represents the remainder of a benzene ring, or n' represents the number 2 when A represents the remainder of a thiophene ring whose sulfur atom is in α position with reference to the carbon atom attached to the ketone carbon atom, the benzene or thiophene remainders having an alkanoic substituent of the formula

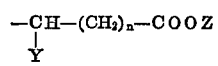

in which Y represents hydrogen or an alkyl having 1 to 3 carbon atoms, Z represents hydrogen, a straight or branched alkyl, possibly substituted by one or several hydroxy groups which can be combined in the form of an acetonide, a dialkylaminoalkyl, a N-heterocyclic aminoalkyl or an alkali metal or alkali earth metal atom, n represents the numbers 0, 1 or 2, the alkanoic substituent being in β position with reference to the carbon atom attached to the ketone carbon chain.

It is to be understood that the term "possibly racemic or optically active" is only to be applied to those compounds of Formula I which contain at least one asymmetric carbon.

Preferably the invention relates to tricyclic ketonic compounds having the formula

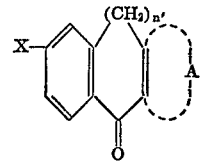

wherein X represents a member selected from the group consisting of hydrogen, halogen and trihalomethyl, n' is an integer from 2 to 3, and A represents the remainder of a ring system selected from the group consisting of benzene, when n' is 2 or 3, and thiophene having its sulfur in position α to the carbon atom attached to the ketone carbon atom, when n' is 2, said remainder of a ring system being substituted in position β to the carbon atom attached to the ketone carbon atom by an alkanoic substituent having the formula

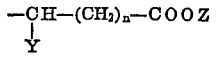

wherein Y represents a member selected from the group consisting of hydrogen and alkyl having 1 to 3 carbon atoms, n is an integer from 0 to 2 and Z represents a member selected from the group consisting of hydrogen, alkali metal, alkali earth metal, aluminum, ammonium, the salt of lower alkylamines, the salt of lower alkanolamines, the salt of glycine, lower alkyl, lower hydroxyalkyl, the acetonide of lower hydroxyalkyl, di-loweralkylamino-lower alkyl and N-heterocyclicamino-lower alkyl.

The invention therefore relates to arylalkanoic acids selected from the group consisting of (A) Compounds of the Formula 1A

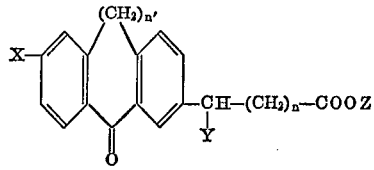

wherein the substituents X, Y, Z and $n$ are defined above and $n'$ represents the numbers 2 or 3, and (B) Compounds of the Formula 1B

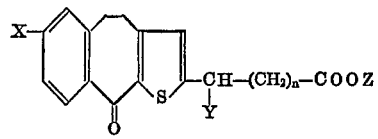

wherein the substituents X, Y, Z and $n$ are defined above.

These compounds are endowed with interesting pharmacological properties. They possess particularly a clear analgesic action and a remarkable anti-inflammatory action, without manifesting troublesome secondary effects such as an ulcerigenic effect.

Among the compounds of the invention are:

(a) 5-oxo-10,11-dihydro-5H-dibenzo/a,d/cycloheptene-3-acetic acid (IA, X, Y and Z=H, $n=0$ and $n'=2$)

(b) 5-oxo-10,11-dihydro-5H-dibenzo/a,d/cycloheptene-3-α-methylacetic acid (IA, X and Z=H, Y=CH$_3$, $n=0$ and $n'=2$)

(c) (2',2'-dimethyl-1',3'-dioxolane)-methyl 5-oxo-10,11-dihydro-5H-dibenzo/a,d/cycloheptene-3-acetate (IA, X and Y=H, Z=(2,2-dimethyl-1,3-dioxolane)-methyl, $n=0$ and $n'=2$)

(d) 2,3'-dihydroxypropyl 5-oxo-10,11-dihydro-5H-dibenzo/a,d/cycloheptene-3-acetate (IA, X and Y=H, Z=2,3-dihydroxypropyl, $n=0$ and $n'=2$)

(e) 5-oxo-8-chloro-10,11-dihydro-5H-dibenzo/a,d/cycloheptene-3-acetic acid (IA, X=Cl, Y and Z=H, $n=0$ $n'=2$)

(f) (2',2-dimethyl-1',3'-dioxolane)-methyl 5-oxo-8-chloro-10,11-dihydro-5H-dibenzo/a,d/cycloheptene-3-acetate (IA, X=Cl, Y—H, Z=(2,2-dimethyl-1,3-dioxolane)-methyl, $n=0$ and $n'=2$)

(g) 10-oxo-4,5-dihydro-benzo/4,5/cyclohepta/2,1b/thiophene-2-acetic acid (IB, X, Y and Z=H and $n=0$)

(h) 10-oxo-4,5-dihydro-benzo/4,5/cyclohepta/2,1b/thiophene-2-α-methylacetic acid (IB, X and Z=H, Y=CH$_3$ and $n=0$)

(i) (2',2'-dimethyl-1',3'-dioxolane)-methyl 10-oxo-4,5-dihydrobenzo/4,5/cyclohepta/2,1b/thiophene-2-acetate (IB, X and Y=H, Z=(2,2-dimethyl-1,3-dioxolane)-methyl and $n=0$)

(j) (2',2'-dimethyl-1',3'-dioxolane)-methyl 10-oxo-4,5-dihydrobenzo/4,5/cyclohepta/2,1b/thiophene-2-α-methylacetate (IB, X=H, Y=CH$_3$, Z=(2,2-dimethyl-1,3-dioxolane)-methyl and $n=0$)

(k) methyl 5-oxo-10,11-dihydro-5H-dibenzo/a,d/cycloheptene-3-α-methylacetate (IA, X=H, Y and Z=CH$_3$, $n=0$ and $n'=2$)

(l) methyl 5-oxo-10,11-dihydro-5H-dibenzo/a,d/cycloheptene-3-acetate (IA, X and Y=H, Z=CH$_3$, $n=0$ and $n'=2$)

(m) 2',3'-dihydroxypropyl 5-oxo-8-chloro-10,11-dihydro-5H-dibenzo/a,d/cycloheptene-3-acetate (IA, X=Cl, Y=H, Z=2,3-dihydroxypropyl, $n=0$ and $n'=2$)

(n) 5-oxo-8-chloro-10,11-dihydro-5H-dibenzo/a,d/cycloheptene-3α-methyl-acetic acid (IA, X=Cl, Y=CH$_3$, Z=H, $n=0$ and $n'=2$)

(o) 5-oxo-10,11-dihydro-5H-dibenzo/a,d/cycloheptene-3-n-butyric acid (IA, X, Y and Z=H, $n=2$ and $n'=2$)

(p) 12-oxo-5,6,7,12-tetrahydro-dibenzo/a,d/cyclooctene-2-acetic acid (IA, X, Y and Z=H, $n=0$ and $n'=3$)

The invention also relates to the pharmaceutical compositions containing one at least of the therapeutically active compounds of general formula I.

These compounds and compositions can be utilized for the treatment of various algia as well as of certain inflammatory maladies, muscular, articular or nervous pains, dental aches, rheumatismal affections, zona, migraines and febrile and infections states in warm-blooded animals.

They are utilized in the form of drinkable or injectable solutions or suspensions, of tablets, coated tablets, sublingual tablets, capsules, suppositories, pomades, creams and topical powders. The useful posology is controlled between 50 mg. and 1 g. of the active product daily in the adult, or between 0.8 mg./kg. and 20 mg./kg. daily, as a function of the method of administration.

The pharmaceutical forms such as drinkable or injectable solutions or suspensions, tablets, coated tablets, sublingual tablets, capsules, suppositories, pomades, creams, and topical powders are prepared according to the usual procedures.

The invention also covers a process of preparation of the tricyclic ketonic compounds of Formula IA

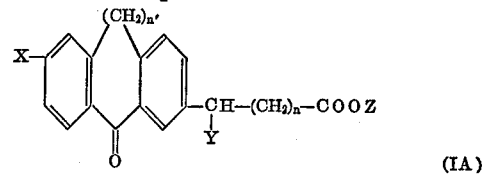

wherein X represents a member selected from the group consisting of hydrogen, halogen and trihalomethyl, $n'$ is an integer from 2 to 3, Y represents a member selected from the group consisting of hydrogen and alkyl having 1 to 3 carbon atoms, $n$ is an integer from 0 to 2 and Z represents a member selected from the group consisting of hydrogen, alkali metal, alkali earth metal, aluminum, ammonium, the salt of lower alkylamines, the salt of lower alkanolamines, the salt of glycine, lower alkyl, lower hydroxyalkyl, the acetonide of lower hydroxyalkyl, di-loweralklamino-lower alkyl and N-heterocyclicamino-lower alkyl which comprises (1) nitrating a compound having the Formula II

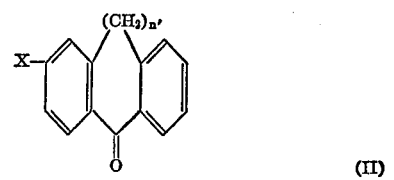

wherein X and $n'$ have the above assigned values, by means of a nitration agent, (2) reducing the resultant nitro compound having the Formula III

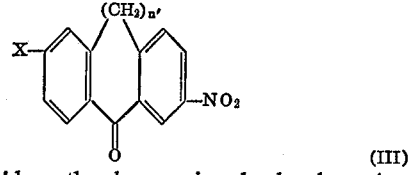

wherein X and $n'$ have the above assigned value, by action of a reducing reactant, (3) effecting a Sandmeyer reaction on the resultant amino compound having the Formula IV

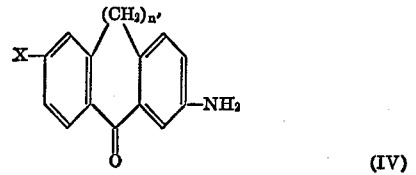

wherein X and n' have the above assigned values, by diazotation, and action of a cupric cyano complex, (4) hydrolyzing the resultant cyano compound having the Formula V

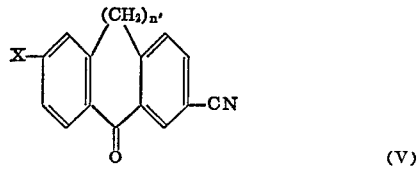

wherein X and n' have the above assigned values, by means of an acid, (5) chain elonging the resultant carboxylic compound having the Formula VI

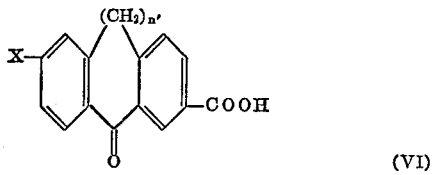

wherein X and n' have the above assigned values, by means of one or more Arndt-Eistert reactions, and (6) recovering said tricyclic ketone compounds of Formula I'A

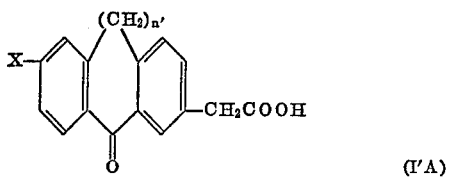

(IA, Y and Z=H, n=0). This compound I'A can be esterified and the ester reacted with a strong base and then by an alkylating derivative having a straight or branched alkyl radical $Y_1$ having 1 to 4 carbon atoms, to obtain, after saponification, an acid of the Formula I"A

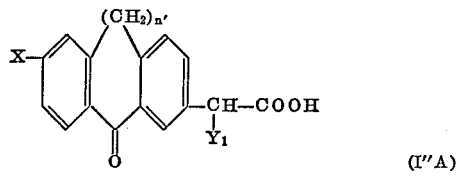

(IA, Z=H, Y=$Y_1$) in which $Y_1$ represents an alkyl having 1 to 4 carbon atoms. Compound I"A or compound I'A can be transformed by Arndt-Eistert chain elongation reactions into an acid homolog of the Formula I'''A

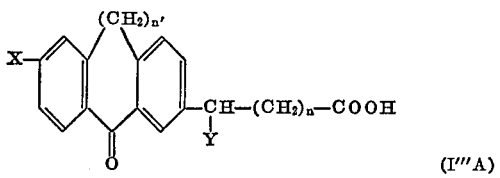

(IA, Z=H) and this compound can be salified or esterified by usual methods. The acid can be reacted with an inorganic or organic base such as the hydroxide or carbonate or an alcohol to give compounds IA where Z is alkali metal, such as sodium, potassium; alkali earth metal, such as magnesium, calcium; aluminium; ammonium; the salt of a lower alkylamine, such as diethylamine, n-propylamine, trimethylamine; the salt of a lower alkylolamine such as mono; di- or tri-ethylolamine; the salt of glycine; lower alkyl, such as methyl, ethyl; lower hydroxyalkyl, such as ethylol, 2,3-dihydroxypropyl; acetonides of lower hydroxyalkyl, such as (2,2-dimethyl-1,3-dioxolane)-methyl; di-loweralkylamino-lower alkyl, such as dimethylaminoethyl, diethylaminopropyl; and N-heterocyclicamino-lower alkyl, such as N-pyridylethyl, N-morpholinomethyl; etc.

In the above process, preferably the following procedures are followed.

(A) The nitrating agent which is utilized to react with the 5-oxo-8-X-10,11-dihydro-5H - dibenzo/a,d/cycloheptene or cyclooctene II is preferably nitric acid in the presence of sulfuric acid, acetic acid or acetic acid anhydride.

(B) The reducing agent utilized in order to obtain the 3-amino compound IV starting from the 3-nitro compound III, is preferably hydrogen in the presence of a catalyst or a metallic salt which results particularly from the action of an acid such as hydrochloric acid, sulfuric acid or acetic acid on a metal such as zinc, iron, tin; or also a mixed hydride in the presence of a metallic catalyst.

(C) The Sandmeyer reaction leading to 3-cyano-5-oxo-8-X-10,11-dihydro-5H-dibenzo/a,d/cycloheptene or cyclooctene, V, is effected particularly by the action of an alkali metal cyanide in the presence of a copper salt, such as cupric sulfate, on the diazonium salt of the 3-amino compound IV.

(D) The acid utilized in order to hydrolyze the nitrile function of 3-cyano-5-oxo-8-X-10,11-dihydro-5H-dibenzo/a,d/cycloheptene or cyclooctene, V, is particularly sulfuric or hydrochloric acid in an aqueous medium. An actually preferred method of operation in order to effect this hydrolysis consists in using a mixture of water, acetic acid and sulfuric acid.

(E) In order to elongate the carboxylic chain of the acid, VI, the method of Arndt-Eistert is preferably used. The acid VI is treated with thionyl chloride to obtain the acid chloride. This acid chloride is reacted with diazomethane to form a diazeketone which is rearranged by the action of a silver salt. The Arndt-Eistert reaction can be applied several times sucessively in order to lead to the carboxylated chain having the desired number of carbon atoms.

The rearrangement of the diazoketone, in the Arndt-Eistert reaction, can be effected in the presence of an alcohol and particularly in the presence of 2,2-dimethyl-4-hydroxymethyl-1,3-dioxolane. By this method, a complex ester such as, for example, the acetonide of the glyceryl ester of a higher homolog of the starting acid can be obtained directly. This acetonide can next be hydrolyzed in order to obtain the free glyceryl ester.

(F) The basic agent used to treat the ester of compound I'A is particularly an alkali metal hydride, amide or dialkylamide, such as sodium hydride, lithium amide and sodium dimethylamide. The alkylating derivative utilized in order to attach the radical $Y_1$ on the acid I'A is of the type Y Hal, $Y^1$, $SO_3Y$, $ArSO_3Y$, $SO_2(OY)_2$ where Y represents a straight or branched alkyl having 1 to 4 carbon atoms, Hal represents chloride bromide or iodide, $Y^1$ represents alkyl and Ar represents an aromatic ring; such as methyl iodide, diethyl sulfate, etc.

(G) The α-alkylated acid I"A, the acid I'A, or the acid I'''A is esterified or salified according to known methods. Esterification can be easily effected by treatment of the acid or one of its functional derivatives, such as the acid chloride or acid anhydride, with an appropriate alcohol, in the presence of an acid or dehydrating catalyst. Esterification also encompasses trans-esterification of lower alkyl esters of the acids. The α-glyceryl esters are prepared in this manner by subjecting the methyl ester of the said compounds to the action of the acetonide of glycerol in the presence of an alkaline agent such as sodium or sodium amide; the intermediate acetonide ester formed is then hydrolzed. This intermediate ester does not have to be isolated.

The salification can be realized by treatment of the acid with a mineral or organic base. In such a method, these are obtained, among others, the sodium salts, the potassium salts, the aluminum salts, the magnesium salts, the calcium salts, the glycine salts or the isopropylamine salts.

(H) The elongation of the chain containing the carboxyl group of the α-alkylated acid I"A in order to obtain the acid I'''A is realized likewise, by subjecting the acid I"A to the Arndt-Eistert reaction under analogous conditions to those given above. The Arndt-Eistert reaction can be applied several times successively in order to give a carboxylated chain having the desired number of carbon atoms.

(I) In the case where the acids of the Formulae I"A or I'"A have an asymetric carbon, the racemates can be resolved by methods used in similar cases, such as, by means of an optically active base and fractional crystallization. The invention also comprises a variant of the process given above which is utilizable when X is hydrogen. This variant is characterized in that 3-bromo-5-oxo-10,11 - dihydro - 5H - dibenzo/a,d/cycloheptene or cyclooctene of the Formula II'

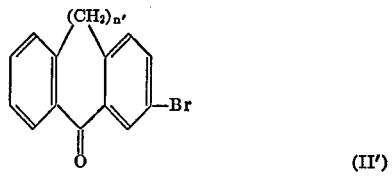

(II')

wherein n' has the above assigned values, is reacted with cuprous cyanide in the presence of a tertiary base in order to obtain 3-cyano-5-oxo-10,11-dihydro-5H-dibenzo/a,d/ cycloheptene or cyclooctene of the Formula V where X=H. The synthesis is then conducted as outlined above.

The tertiary base utilized in the above reaction is preferably quinoline.

Another variant of the above process where X is hydrogen is characterized in that ammonia in the presence of a catalyst is reacted with 3-bromo-5-oxo-10,11-dihydro-5H-dibenzo/a,d/cycloheptene or cyclooctene II' in order to obtain the corresponding 3-amino compound IV, where X=H. This compound is then utilized in the remainder of the synthesis. The catalyst is preferably cuprous chloride and the reaction is effected under pressure.

The invention also covers a process of preparation of the tricyclic ketonic compounds of Formula IB

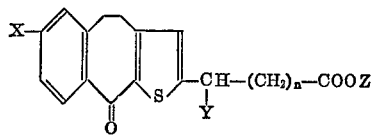

wherein X represents a member selected from the group consisting of hydrogen, halogen and trihalomethyl, $n$ is an integer from 0 to 2, Y represents a member selected from the group consisting of hydrogen and alkyl having 1 to 3 carbon atoms, and Z represents a member selected from the group consisting of hydrogen, alkali metal, alkali earth metal, aluminum, ammonium, the salt of lower alkylamines, the salt of lower alkanolamines, the salt of glycine, lower alkyl, lower hydroxyalkyl, the acetonide of lower hydroxyalkyl, di-loweralkylamino-lower alkyl and N-heterocyclicamino-lower alkyl, which comprsies the steps of (1) reacting a tri-lower alkyl phosphite with 2-lower alkyloxycarbonyl-4-bromomethyl-thiophene, (2) reacting the resultant phosphonate having the Formula IX

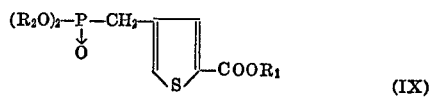

(IX)

wherein $R_1$ and $R_2$ are lower alkyl, with a benzoic acid having the formula

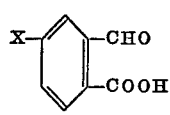

wherein X has the above assigned value, in a basic reaction media, (3) reducing the resultant trans compound having the Formula X

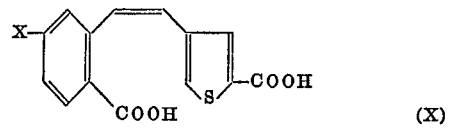

(X)

wherein X has the above assigned value, by action of an olefinic reducing agent, (4) cyclizing the resultant ethyl compound having the Formula XI

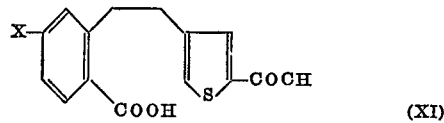

(XI)

wherein X has the above assigned value, (5) chain elonging the resultant carboxylic compound having the Formula XII

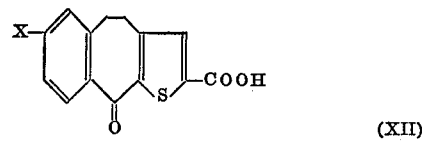

(XII)

wherein X has the above assigned value, by means of one or more Arndt-Eistert reactions, and (6) recovering said tricyclic ketonic compounds of Formula IB. The Arndt-Eistert reaction comprises reacting the acid compound XII with a chlorinating agent, reacting the resultant acid chloride of Formula XIII

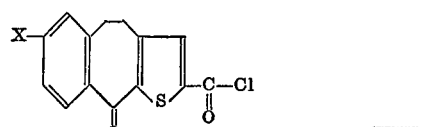

(XIII)

with a derivative of the formula Y—CH=N$_2$ where Y represents hydrogen or alkyl having 1 to 3 carbon atoms, to get the diazoketone of the Formula XIV

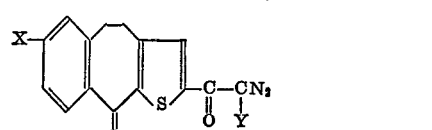

(XIV)

this latter compound XIV is rearranged thermally in the presence of a high boiling alcohol in order to obtain an acetic acid compound of the Formula I'B

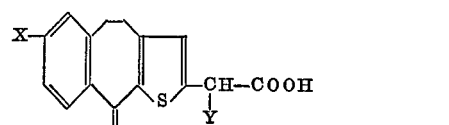

(I'B)

(IB, where Z=H and $n$=0). This latter is transformed, if desired into an acid homolog of Formula I"B

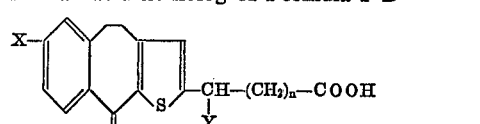

(I"B)

(IB, where Z=H). The latter compound is then possibly esterified or salified by usual methods as indicated above for the acid I'"A.

The following are the preferred steps in the above process:

(A) The tri-lower alkyl-phosphite which is reacted with the 2-lower alkyloxycarbonyl-4-bromomethyl-thiophene is preferably triethyl phosphite. The above condensation is effected by heating the mixed reactants to 160° C.

(B) The basic reaction media utilized in the condensation of the 2-formyl-4-X-benzoic acid with the phosphonate IX is particularly an alkali metal lower alkanolate, an alkali metal hydride, an alkali metal amide or lower alkyllithium. This condensation is preferably effected in the presence of an organic solvent or a mixture of organic solvents such as methylene chloride, chloroform, ethyl ether, dimethylsulfoxide, tetrahydrofuran, dimethoxyethane or dimethylformamide.

(C) The olefinic reducing agent utilized to reduce the ethylenic double bond of the trans 4-[β-(2'-carboxy-5'-X-phenyl)-vinyl]-thiophene-2-carboxylic acid, X, is preferably hydriodic acid in the presence of red phosphorus. This reduction is conveniently effected by heating in the presence of acetic acid.

(D) The cyclization of the 4-[β-(2'-carboxy-5'-X-phenyl)-ethyl]-thiophene-2-carboxylic acid, XI, is preferentially effected in the presence of a cyclization agent, preferably polyphosphoric acid.

(E) The chlorinating agent employed to prepare the acid chloride, XIII, is particularly thionyl chloride, oxalyl chloride or sulfuryl chloride.

(F) When the derivative Y—CH=N$_2$, which is condensed with the acid chloride, XIII, is diazomethane (Y=H), the resultant acid I'B has in the 2 position, a carboxylated chain which is not alkylated in the α position, —CH$_2$COOH. When the derivative Y—CH=N$_2$ is diazoethane, diazopropane or diazobutane (Y=CH$_3$, C$_2$H$_5$, C$_3$H$_7$) 

the resultant acid I'B has an alkylated chain in the α position,

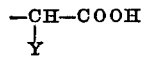

The reaction of the acid chloride, XIII, with diazoalkane is preferably effected in the presence of methylene chloride.

(G) The rearrangement of the diazoketone, XIV, is preferably thermic. It can be effected in the presence of an alcohol, such as 2,2-dimethyl-4-hydroxymethyl-1,3-dioxolane. In this case, the acetonide of the glyceryl ester of the higher homolog of the starting acid is then obtained directly. This acetonide can be hydrolyzed in an acid media.

(H) The possible further elongation of the chain containing the carboxylic group, then esterification or salification, if desired, are effected according to the usual methods as outlined above with reference to the compounds IA. It is to be understood that the intermediate obtained in the course of the process described above are also novel compounds.

The following examples are illustrated of the practice of the invention without, however, conferring any limiting characteristics thereto.

EXAMPLE I

5-Oxo-10,11-Dihydro-5H-Dibenzo/a,d/Cycloheptene-3-Acetic Acid

Step A: 3-cyano-5-oxo-10,11-dihydro-5H-dibenzo/a,d/cycloheptene 35 gm. of 3-bromo-5-oxo-10,11-dihydro-5H-dibenzo/a,d/cycloheptene (obtained according to the procedure described by Ebnother et al., Helv. 48, 1,244 (1965)), 110 cc. of quinoline and 22 gm. of cuprous cyanide were mixed and the reaction mixture was heated to reflux under agitation for thirty minutes. Next, the mixture was cooled and 1,300 cc. of 2 N hydrochloric acid, then 200 cc. of methylene chloride, was added thereto. The insolubles were filtered and the organic phases were washed with N hydrochloric acid. The separated aqueous phase was reextracted with methylene chloride. The combined organic phases were dried over magnesium sulfate, filtered and distilled to dryness under vacuum.

The residue was dissolved in 50 cc. of methylene chloride and the solution was passed through a column of magnesium silicate. The column was washed with methylene chloride and the methylene chloride solution was distilled to dryness under vacuum. The dry crystallized residue was taken up in 500 cc. of ether, vacuum filtered, washed with ether, then with isopropyl ether and dried. 25 gm. of 3-cyano-5-oxo-10,11-dihydro-5H-dibenzo/a,d,/cycloheptene were obtained. For analysis, the product was recrystallized from ether.

The compound was obtained in the form of clear, beige crystals, soluble in methylene chloride and ethanol, insoluble in water and melting at 106° C.

*Analysis.*—C$_{16}$H$_{11}$NO; molecular weight=233.26. Calculated (percent): C, 82.38; H, 4.75; N, 6.0. Found (percent): C, 82.6; H, 4.5; N, 6.3.

I.R. spectra (chloroform):

Presence of a conjugated ketone at 1649$^{cm.-1}$
Presence of aromatic ring at 1600$^{cm-1}$
Presence of a conjugated C≡N at 2229$^{cm.-1}$ U.V. spectra (ethanol):

Max. at 226 nm., ε=33150
Max. at 269 nm., ε=12750
Infl. at 346 nm., E$_{1\,cm.}^{1\%}$=19

Step B: 5-oxo-10,11-dihydro-5H-dibenzo/a,d/cycloheptene-3-carboxylic acid 25 gm. of 3-cyano-5-oxo-10,11-dihydro-5H-dizeno/a,d/cycloheptene were placed in suspension in 100 cc. of a solution made with:

|  | Cc. |
|---|---|
| Water | 100 |
| Acetic acid | 100 |
| Sulfuric acid | 100 |

This suspension was heated to reflux for a period of 2½ hours. Then the suspension was cooled, diluted with 300 cc. of water and extracted with methylene chloride containing 10% of methanol. The organic phases were washed with N sodium hydroxide. The wash waters were acidified by the addition of concentrated hydrochloric acid and extracted with methylene chloride containing 10% of methanol. The organic solution was dried over magnesium sulfate, filtered and distilled to dryness under vacuum.

The residue was dissolved in 500 cc. of methanol at reflux, concentrated to 150 cc. and cooled. The crystals were vacuum filtered, washed with methanol and dried at 80° C. 23.5 gm. of 5-oxo-10,11-dihydro-5H-dibenzo/a,d/cycloheptene-3-carboxylic acid were obtained in the form of colorless crystals melting at 220° C., soluble in ethanol and dilute sodium hydroxide solution, slightly soluble in methylene chloride and insoluble in water.

For analysis, the product was purified by sublimation. The melting point remained unchanged.

*Analysis.*—C$_{16}$H$_{12}$O$_3$; molecular weight=252.26. Calculated (percent): C, 76.18; H, 4.80. Found (percent): C, 76.0; H, 4.6.

I.R. spectra (Nujol):

Absence of —C≡N
Presence of C=O at 1681$^{cm.-1}$
Bands at 1644 and 1605$^{cm.-1}$
Presence of aromatic ring at 1564$^{cm.-1}$ U.V. spectra (ethanol):

Max. at 229 nm., E$_{1\,cm.}^{1\%}$=1023 or ε=25800
Max. at 271 nm., E$_{1\,cm.}^{1\%}$=548 or ε=13800
Infl. toward 345 nm., E$_{1\,cm.}^{1\%}$=20

Step C: 5-oxo-10,11-dihydro-5H-benzo/a,d/cycloheptene-3-acetic acid (1) Preparation of the acid chloride.—10 gm. of 5-oxo-10,11-dihydro-5H-benzo/a,d/cycloheptene - 3 - carboxylic acid were agitated for 1 hour at reflux in 80 cc. of thionyl chloride. Then, the thionyl chloride was distilled off under vacuum. 50 cc. of benzene were added and the mixture was distilled to dryness under vacuum. Again 50 cc. of benzene were added and the mixture was distilled to dryness under vacuum. 5-oxo-10,11-dihydro-5H-dibenzo/a, d/cycloheptene-3-carboxylic acid chloride was obtained in the form of yellow crystals, very slightly soluble in ether.

(2) Preparation of the diazoketone.—The acid chloride obtained above was dissolved in methylene chloride and 440 cc. of a solution of diazomethane in methylene chloride at a concentration of 12 gm./liter were added at a temperature of +3° to +5° C. The solution was agitated for 45 minutes at 5° C. and then distilled to dryness under vacuum. The residue was washed with ether and 11 gm. of the diazoketone were obtained melting at 90° C. (with decomposition).

(3) Decomposition of the diazoketone.—3.3 gm. of silver oxide, 6 gm. of sodium carbonate and 4.4 gm. of sodium thiosulfate were placed in suspension in 100 cc. of water. The suspension was heated to 65° C. and a solution of 11 gm. of the diazoketone obtained above in 80 cc. of dioxane was added thereto under agitation. The mixture was agitated for 30 minutes at 65° C. Then 1 gm. of silver oxide was added and the agitation was continued for another 30 minutes at 65° C. The hot suspension was filtered and the solid was rinsed with a saturated aqueous solution of sodium bicarbonate. The neutral fraction was extracted with methylene chloride. The alkaline mother liquors were acidified by the addition of concentrated hydrochloric acid and extracted with methylene chloride. The combined organic phases were dried over magnesium sulfate, filtered and distilled to dryness under vacuum. The residue was taken up with 30 cc. of ether and vacuum filtered.

6 gm. of 5-oxo-10,11-dihydro-5H-dibenzo/a,d/cycloheptene-3-acetic acid were obtained. For analysis, the product was purified by recrystallization from ether.

The compound occurred in the form of yellow prisms melting at 150° C. and soluble in methylene chloride, slightly soluble in ether and insoluble in water.

*Analysis.*—$C_{17}H_{14}O_3$; molecular weight=266.28. Calculated (percent): C, 76.67; H, 5.30. Found (percent): C, 76.7; H, 5.1.

I.R. spectra (chloroform):

Presence of C=O at 1709 and 1644 cm.$^{-1}$
Presence of aromatic ring at 1597 cm.$^{-1}$ U.V. spectra (ethanol):

Max. at 271 nm., $E^{1\%}_{1cm.}$=557 or $\epsilon$=14850

Infl. towards 350 nm., $E^{1\%}_{1cm.}$=20

EXAMPLE II

5-Oxo-10,11-Dihydro-5H-Dibenzo/a,d/Cycloheptane-3-Propionic Acid

Starting from 5 - oxo - 10,11-dihydro-5H-dibenzo/a,d/ cycloheptene-3-acetic acid, prepared in Step C of Example I, and by effecting again the Arndt-Eistert reaction as described in Step C of Example I, 5-oxo-10,11-dihydro-5H-dibenzo/a,d/cycloheptene-3-propionic acid was obtained.

The product occurred in the form of white crystals melting at 99° C. and soluble in methylene chloride and ethanol and slightly soluble in isopropyl ether.

*Analysis.*—$C_{18}H_{16}O_3$; molecular weight=280.33. Calculated (percent): C, 77.12; H, 5.75. Found (percent): C, 76.9; H, 5.7.

I.R. spectra (chloroform):

Presence of a conjugated ketone at 1646 cm.$^{-1}$
Presence of aromatic ring at 1606 cm.$^{-1}$—1599 cm.$^{-1}$
Presence of an acid carbonyl at 1713 cm.$^{-1}$ U.V. spectra (ethanol):

Max. at 272 nm., $E^{1\%}_{1cm.}$=584 or $\epsilon$=16400

EXAMPLE III

5-Oxo-10,11-Dihydro-5H-Dibenzo/a,d/Cycloheptene-3-n-Butyric Acid

Starting from 5 - oxo - 10,11-dihydro-5H-dibenzo/a,d/ cycloheptene-3-propionic acid of Example II and by effecting again the Arndt-Eistert reaction as described in Step C of Example I, 5-oxo-10,11-dihydro-5H-dibenzo/a,d/ cycloheptene-3-n-butyric acid was obtained.

The product occurred in the form of white crystals melting at 72° C. and soluble in ethanol methylene chloride and dilute sodium hydroxide solution, slightly soluble in ether and insoluble in water.

*Analysis.*—$C_{19}H_{18}O_3$; molecular weight=294.33. Calculated (percent): C, 77.53; H, 6.16. Found (percent): C, 77.7; H, 6.2.

I.R. spectra (chloroform): Presence of a conjugated ketone, an acid carbonyl and an acid hydroxyl.

U.V. spectra (ethanol):

Max. at 271 nm., $E^{1\%}_{1cm.}$=509 or $\epsilon$=15000

EXAMPLE IV (2′,2′-Dimethyl-1′,3′-Dioxolane)-Methyl-5-Oxo-10,11-Dihydro-5H-Dibenzo/a,d/Cycloheptene-3-Acetate 3.1 gm. of the diazoketone obtained in Step C of Example I was introduced into a mixture of 31 cc. of 2,2-dimethyl-4-hydroxymethyl-1,3-dioxolane and 1.8 cc. of anhydrous triethylamine. 0.310 gm. of silver benzoate was added to the solution obtained. 250 cc. of nitrogen were recovered over a period of 45 minutes. The mixture was agitated for a further 30 minutes, taken up in water and extracted with ether. The ethereal extracts were washed with water, dried over magnesium sulfate and concentrated to dryness by distillation under reduced pressure. The residue was purified by chromatography through silica gel and elution with a (9:1) mixture of benzene and ethyl acetate. 2.8 gm. of (2′,2′-dimethyl-1′,3′-dioxolane)-methyl 5-oxo-10,11-dihydro-5H-dibenzo/a,d/cycloheptene - 3- acetate were obtained.

*Analysis.*—$C_{23}H_{24}O_5$; molecular weight=380.42. Calculated (percent): C, 72.61; H, 6.36. Found (percent): C, 72.6; H, 6.2.

U.V. spectra (ethanol):

Max. at 270 nm., $E^{1\%}_{1cm.}$=398

Infl. at 300 nm., $E^{1\%}_{1cm.}$=98

Infl. at 346 nm., $E^{1\%}_{1cm.}$=14

EXAMPLE V

2′,3′-Dihydroxypropyl 5-Oxo-10,11-Dihydro-5H-Dibenzo/ a,d/Cycloheptene-3-Acetate 4.5 gm. of the acetonide ester of Example IV were introduced into 27 cc. of water under an atmosphere of nitrogen. 16.2 cc. of acetic acid were added and the mixture was heated in a bath at 100° C. for 1 hour and 15 minutes, then cooled. The reaction mixture was poured into water and the aqueous phase was extracted with methylene chloride. The methylene chloride phases were washed with water, with water saturated with sodium bicarbonate, dried and concentrated to dryness by distillation under reduced pressure.

The residue was purified by chromatography through silica gel and elution with a (9:1) mixture of chloroform and methanol. 3 gm. of 2′,3′-dihydroxypropyl 5-oxo-10,11 - dihydro - 5H-dibenzo/a,d/cycloheptene-3-acetate were obtained.

*Analysis.*—$C_{20}H_{20}O_5$; molecular weight=340.06. Calculated (percent): C, 70.57; H, 5.92. Found (percent): C, 70.3; H, 6.2.

U.V. spectra (ethanol):

Max. at 270–271 nm., $\epsilon$=14700

Infl. at 306 nm., $E^{1\%}_{1cm.}$=99

Infl. at 345 nm., $E^{1\%}_{1cm.}$=15

EXAMPLE VI

Methyl dl-5-Oxo-10,11-Dihydro-5H-Dibenzo/a,d/Cycloheptene-3-α-Methyl-Acetate 6.2 g. of 5 - oxo-10,11-dihydro-5H-dibenzo/a,d/cycloheptene-3-acetic acid obtained in Step C of Example I were dissolved in 50 cc. of methylene chloride. The solution was cooled to +5° C. and 100 cc. of a methylene chloride solution of diazomethane containing 16 gm./liter was added thereto. The mixture was agitated for 5 minutes at +5° C., then for 30 minutes at room temperature and thereafter distilled to dryness under vacuum. 6.2 gm. of methyl 5 - oxo-10,11-dihydro-5H-dibenzo/a,d/cycloheptene-3-acetate was obtained.

30 cc. of hexamethylphosphorotriamide and 33.6 cc. of a tetrahydrofuran solution of diethylamine containing 5 gm. per 100 cc. of solution were mixed and cooled to −30° C. 21.6 cc. of a hexane solution of butyl lithium testing 6.80 gm. per 100 cc. of solution were added. The temperature mounted to −12° C. and was cooled at −30° C. The solution was agitated for 5 minutes and 6.2 gm. of the methyl ester obtained above in solution in 10 cc. of tetrahydrofuran and 10 cc. of hexamethylphosphorotriamide, was added thereto. The mixture was cooled at −30° C. and 4.5 cc. of methyl iodide was added. The reaction mixture was maintained at a temperature of −20° C. while agitating for 10 minutes, then it was poured into water. The mixture was extracted with ether. The organic phases were combined, washed with water, dried over magnesium sulfate, filtered and distilled to dryness under vacuum.

The residue was purified by chromatography over silica gel with elution by a mixture (8:2) of cyclohexane and ethyl acetate. After evaporation of the solvent, the product was recrystallized from isopropyl ether. 3.7 gm. of methyl dl - 5-oxo-10,11-dihydro-5H-dibenzo/a,d/cycloheptene-3-α-methyl-acetate was obtained in the form of colorless crystals melting at 73° C. and soluble in ethanol and methylene chloride and insoluble in water.

*Analysis.*—$C_{19}H_{18}O_3$; molecular weight=294.33. Calculated (percent): C, 77.53; H, 6.16. Found (percent): C, 77.4; H, 6.3.

I.R. spectra (chloroform):

Presence of conjugated ketone at $1647^{cm.-1}$
Presence of aromatic ring at $1598^{cm.-1}$
Presence of ester carbonyl at $1730^{cm.-1}$ U.V. spectra (ethanol):

Max. at 270 nm., $E^{1\%}_{1cm.}=514$ or $\epsilon=15100$
Infl. towards 342 nm., $E^{1\%}_{1cm.}=19$

EXAMPLE VII dl-5-Oxo-10,11-Dihydro-5H-Dibenzo/a,d/Cycloheptene-3-α-Methyl-Acetic Acid 3.6 gm. of methyl dl-5-oxo-10,11-dihydro-5H-dibenzo/a,d/cycloheptene-3-α-methyl-acetate were placed in suspension in 35 cc. of ethanol, 3.5 cc. of water and 3.5 cc. of sodium hydroxide solution and the suspension was agitated for 16 hours at ambient temperature under nitrogen. The mixture was then concentrated to 10 cc., 100 cc. of water was added and the aqueous mixture was acidified by the addition of 5 cc. of concentrated hydrochloric acid. The mixture was extracted with methylene chloride. The organic phases were washed with water, dried over magnesium sulfate, filtered and distilled to dryness under vacuum.

3.4 gm. of dl - 5-oxo-10,11-dihydro-5H-dibenzo/a,d/cycloheptene-3-α-methyl-acetic acid were obtained in the form of a pale yellow product soluble in ethanol, ether, methylene chloride and dilute sodium hydroxide solution and insoluble in water.

*Analysis.*—$C_{18}H_{16}O_3$; molecular weight=280.31. Calculated (percent): C, 77.12, H, 5.75. Found (percent): C, 76.9; H, 6.0.

I.R. spectra (chloroform):

Presence of acid carbonyl at $1711^{cm.-1}$
Presence of conjugated ketone at $1646^{cm.-1}$
Presence of aromatic ring at $1598^{cm.-1}$ U.V. spectra (ethanol):

Max. at 271 nm., $E^{1\%}_{1cm.}=552$ or $\epsilon=14650$
Infl. towards 342 nm., $E^{1\%}_{1cm.}=20$

EXAMPLE VIII

5-Oxo-8-Chloro-10,11-Dihydro-5H-Dibenzo/a,d/Cycloheptene-3-Acetic Acid

Step A: 3-nitro-5-oxo-8-chloro-10,11dihydro-5H-dibenzo/a,d/cycloheptene 7 gm. of 5-oxo-8-chloro-10,11-dihydro-5H-dibenzo/a,d/cycloheptene (obtained according to the process described in J. Org. Chem. 1962, 27, 230) were placed in suspension in 16.8 cc. of acetic acid. 16.8 cc. of fuming nitric acid were added. The reaction mixture was agitated for one hour fifteen minutes at ambient temperature and then poured into water. The aqueous mixture was extracted with methylene chloride. The organic phases were combined, washed with a saturated aqueous solution of sodium bicarbonate, then with water, dried over magnesium sulfate, filtered and distilled to dryness. The residue was dissolved in 10 cc. of ether, allowed to crystallize overnight and vacuum filtered.

5 gm. of 3 - nitro-5-oxo-8-chloro-10,11-dihydro-5H-dibenzo/a,d/cycloheptene were obtained in the form of colorless crystals soluble in ethanol and ether and insoluble in water. For analysis, the compound was recrystallized from ether. M.P.=120° C., then 128° C.

*Analysis.*—$C_{15}H_{10}ClNO_3$; molecular weight=287.70. Calculated (percent): C, 62.82; H, 3.50; Cl, 12.32; N, 4.87. Found (percent): C, 62.5; H, 3.4; Cl, 12.4; N, 4.9.

I.R. spectra (chloroform): Presence of carbonyl at $1651^{cm.-1}$, of aromatic ring at 1608 and $1588^{cm.-1}$ and of $NO_2$ at 1522 and $1346^{cm.-1}$.

U.V. spectra (ethanol):

Max. at 272 nm., $\epsilon=23600$
Infl. towards 340 nm., $E^{1\%}_{1cm.}=28.3$

Step B: 3-amino-5-oxo-8-chloro-10,11-dihydro-5H-dibenzo/a,b/cycloheptene

A mixture of 6.75 cc. of acetic acid, 6.75 gm. of 3-nitro-5-oxo - 8 - chloro-10,11-dihydro-5H-dibenzo/a,d/cycloheptene and 47.5 cc. of aqueous hydrochloric acid was heated to 80° C. 13.5 gm. of tin was added and the mixture was agitated for 4½ hours and then cooled. The reaction mixture was poured into iced water, then alkalinized by addition of 60 cc. of sodium hydroxide solution while maintaining an interior temperature of 15° C., and filtered. The filter cake was washed with methylene chloride and 200 cc. of methylene chloride was added to the combined filtrates. The organic phase was separated, washed with water, dried over magnesium sulfate, filtered, and distilled to dryness under vacuum.

The residue was taken up by 4 cc. of ether, allowed to crystallize overnight and vacuum filtered. 4.8 gm. of 3-amino - 5 - oxo-8-chloro-10,11-dihydro-5H-dibenzo/a,d/cycloheptene was obtained in the form of yellow crystals melting at 120° C. and soluble in either and insoluble in water.

*Analysis.*—$C_{15}H_{12}NOCl$; molecular weight=257.70. Calculated (percent): C, 69.91; H, 4.69; N, 5.43; Cl, 13.77. Found (percent): C, 69.9; H, 4.8; N, 5.3; Cl, 13.4.

I.R. spectra (chloroform): Presence of conjugated ketone at 1658 and $1640^{cm.-1}$.

U.V. spectra (ethanol):

Max. at 241 nm., $\epsilon=13400$
Max. at 270–271 nm., $\epsilon=12750$
Max. at 347 nm., $\epsilon=1680$

Step C: 3-cyano-5-oxo-8-chloro-10,11-dihydro-5H-dibenzo/a,d/cycloheptene (1) Preparation of the cyano cupric complex.—22.5 gm. of copper sulfate containing $5H_2O$ were dissolved in 36 cc. of water and 45 cc. of a 22° Bé. ammonia solution. The solution was cooled to 5° C., a solution of 23.4 gm. of potassium cyanide in 36 cc. of water was added and the mixture was agitated for 30 minutes.

(2) Preparation of the diazonium salt.—7.68 gm. of 3-amino-5-oxo-8-chloro - 10,11 - dihydro-5H-dibenzo/a,d/ cyclophentene were placed in suspension in 78 cc. of water and 7.8 cc. of concentrated hydrochloric acid. A solution of 2.07 gm. of sodium nitrite in 6 cc. of water was added thereto and the solution was maintained at 5° C.

(3) Cyanidation.—The solution of the diazonium salt obtained in (2) above was added to the solution of the cyano cupric complex obtained in (1) above and the mixture was heated to 53° C. (interior) for 30 minutes. The mixture was filtered and the filter cake was rinsed with methylene chloride. The filtrates were washed with water, dried over magnesium sulfate, filtered and distilled to dryness. The residue was dissolved in 10 cc. of methylene chloride and the solution was passed through a column of magnesium silicate. The head fraction was recovered in 500 cc. of methylene chloride. The solution was evaporated to dryness. The residue was triturated with ether and vacuum filtered.

3.5 of 3-cyano - 5 - oxo-8-chloro-10,11-dihydro-5H-dibenzo/a,d/cycloheptene was obtained in the form of orange crystals melting at 130° C. and soluble in ether and insoluble in water.

I.R. spectra (chloroform): Presence of C≡N at $2230^{cm.-1}$ and C=O at 1659 and $1645^{cm.-1}$.

Step D: 5-oxo-8-chloro-10,11-dihydro-5H-dibenzo/a,d/cycloheptene-3-carboxylic acid A suspension of 4 gm. of 3-cyano-5-oxo-8-chloro-10,11-dihydro-5H-dibenzo/a,d/cycloheptene in 40 cc. of a solution of:

|  | Cc. |
|---|---|
| Acetic acid | 100 |
| Water acid | 100 |
| Sulfuric acid | 100 | was heated to 140° C. for 3 hours. The reaction mixture was cooled; poured into water and extracted with methylene chloride. The organic phases were washed with water, dried over magnesium sulfate, filtered and distilled to dryness under vacuum. The residue was triturated with methylene chloride, vacuum filtered, washed with methylene chloride and dried.

3.2 gm. of 5-oxo-8-chloro-10,11-dihydro-5H-dibenzo/a,d/cycloheptene-3-carboxylic acid were obtained in the form of colorless crystals soluble in ether and sodium hydroxide solution and insoluble in water. By sublimation, the pure product for analysis was obtained melting at 236° C.

Analysis.—$C_{16}H_{11}O_3Cl$; molecular weight=286.70. Calculated (percent): C, 67.02; H, 3.87; Cl, 12.36. Found (percent): C, 67.0; H, 3.8; Cl, 12.6.

I.R. spectra (Nujol): Presence of acid carbonyl at $1696^{cm.-1}$, of conjugated ketone at $1661^{cm.-1}$ and of aromatic ring at 1608 and $1583^{cm.-1}$ U.V. spectra (ethanol):

Max. at 228–229 nm., $\epsilon=28150$
Max. at 275 nm., $\epsilon=16900$

Step E: 5-oxo-8-chloro-10,11-dihydro-5H-dibenzo/a,d/ cycloheptene-3-acetic acid (1) Preparation of the diazoketone.—A mixture of 570 mg. of 5-oxo-8-chloro-10,11-dihydro-5H-dibenzo/a,d/cycloheptene-3-carboxylic acid and 5 cc. of thionyl chloride were agitated for 2½ hours at reflux. The excess thionyl chloride was distilled. 5 cc. of benzene was added and the mixture was evaporated to dryness. Again 5 cc. of benzene was added and the mixture was evaporated to dryness. The residue was dissolved in 5 cc. of methylene chloride. 50 cc. of a methylene chloride solution of diazomethane testing 11 gm./liter was added and the mixture was agitated 1 hour and 45 minutes at ambient temperature. 520 mg. of the diazoketone was obtained in the form of yellow crystals melting at 95° C., then at 128° C.

(2) Decomposition of the diazoketone.—60 mg. of silver oxide, 250 mg. of sodium carbonate and 200 mg. of sodium thiosulfate were placed in suspension in 3 cc. of water heated to 70° C. 520 mg. of the diazoketone obtained above in solution in 3 cc. of dioxane was added thereto under agitation. The mixture was agitated for 2 hours at 70° C. while gradually adding 240 mg. of silver oxide. The hot mixture was filtered and the filter was rinsed with 2 N sodium hydroxide solution. The alkaline phases were washed with methylene chloride and acidified by the addition of 3 cc. of concentrated hydrochloric acid. The acidified phase was extracted with methylene chloride. The organic phases were dried over magnesium sulfate, filtered and distilled to dryness under vacuum. The residue was triturated with 0.5 cc. of ether and vacuum filtered.

300 mg. of 5-oxo-8-chloro-10,11-dihydro-5H-dibenzo/a,d/cycloheptene-3-acetic acid were obtained in the form of crystals melting at 174° C. and soluble in ether and dilute sodium hydroxide solution and insoluble in water. For analysis, the product was recrystallized from isopropyl ether. The melting point remained unchanged.

Analysis.—$C_{17}H_{13}O_3Cl$; molecular weight=300.73. Calculated (percent): C, 67.89; H, 4.36; Cl, 11.79. Found (percent): C, 67.8; H, 4.6; Cl, 11.6.

I.R. spectra (chloroform): Presence of carbonyl at $1714^{cm.-1}$, of conjugated ketone at $1645^{cm.-1}$ and of aromatic ring at 1610 and $1590^{cm.-1}$.

U.V. spectra (ethanol):

Max at 276 nm., $\epsilon=18000$

EXAMPLE IX (2',2'-Dimethyl-1',3'-Dioxolane)-Methyl 5-Oxo-8-Chloro-10,11 - Dihydro - 5H - Dibenzo/a,d/Cycloheptene-3-Acetate 7.3 gm. of (2',2'-dimethyl-1',3'-dioxolane)-methyl 5-oxo-8-chloro - 10,11 - dihydro - 5H - dibenzo/a,d/cycloheptene-3-acetate were obtained starting from 10.6 gm. of the diazoketone (obtained in Step E of Example VIII) and 100 cc. of 2,2-dimethyl-4-hydroxymethyl-1,3-dioxolane, by operating in the same manner as in Example IV. The product occurred in the form of a colorless amorphous product, soluble in ether and benzene and insoluble in water.

Analysis.—$C_{23}H_{23}ClO_5$; molecular weight=414.87. Calculated (percent): C, 66.58; H, 5.59; Cl, 8.55. Found (percent): C, 66.6; H, 5.6; Cl, 8.7.

I.R. spectra (chloroform): Presence of ester carbonyl at $1741^{cm.-1}$, of conjugated ketone at $1647^{cm.-1}$, and of aromatic ring at 1611 and $1595^{cm.-1}$.

U.V. spectra (ethanol):

Infl. towards 212 nm. $E^{1\%}_{1cm.}=705$

Max. at 276 nm., $E^{1\%}_{1cm.}=455$ or $\epsilon=18900$

Infl. towards 345 nm., $E^{1\%}_{1cm.}=17$

Infl. towards 363 nm., $E^{1\%}_{1cm.}=11$

EXAMPLE X

2',3'-Dihydroxypropyl 5-Oxo-8-Chloro-10,11-Dihydro-5H-Dibenzo/a,d/Cycloheptene-3-Acetate 4 gm. of (2',2'-dimethyl-1',3'-dioxolane)-methyl 5-oxo-8-chloro - 10,11 - dihydro-5H-dibenzo/a,d/cycloheptene-3-acetate, obtained in Example IX, were introduced into 25 cc. of water under an atmosphere of nitrogen. 15 cc. of acetic acid were added and the mixture was heated to 100° C. for 1½ hours. The reaction mixture was cooled and poured into a saturated aqueous solution of sodium bicarbonate. The aqueous phase was extracted with ether and the organic phases were dried over magnesium sulfate, filtered and concentrated to dryness by distillation under reduced pressure. The residue was purified by chromatography through silica gel with elution with a (9:1) mixture of methylene chloride and methanol.

2.5 gm. of 2′,3′-dihydroxypropyl 5-oxo-8-chloro-10,11-dihydro-5H-dibenzo/a,d/cycloheptene-3-acetate were obtained in the form of a colorless amorphous product, soluble in ether, methanol and chloroform.

*Analysis.*—$C_{20}H_{19}ClO_5$; molecular weight=374.81. Calculated (percent): C, 64.09; H, 5.11; Cl, 9.46. Found (percent): C, 63.9; H, 5.3; Cl, 9.9.

I.R. spectra (coloroform):

Presence of conjugated ketone at 1645$cm.^{-1}$
Presence of aromatic ring at 1607 and 1588$cm.^{-1}$
Presence of ester at 1739$cm.^{-1}$ U.V. spectra (ethanol):

Infl. towards 213 nm., $E^{1\%}_{1cm.}$=653

Max. at 276 nm., $E^{1\%}_{1cm.}$=461 or $\epsilon$=17300

Infl. towards 348 nm., $E^{1\%}_{1cm.}$=16

EXAMPLE XI dl-5-Oxo-8-Chloro-10,11-Dihydro-5H-Dibenzo/a,d Cycloheptene-3-α-Methylacetic acid Step A: (2′,2′-dimethyl-1′,3′-dioxolane)-methyl 5-oxo-8-chloro-10,11-dihydro-5H - dibenzo/a,d/cycloheptene-3-α-methylacetate 24 cc. of hexamethyl phosphorotriamide were introduced under agitation into 18.8 cc. of a tetrahydrofuran solution containing 5 gm. per 100 gm. of diethylamine and 8.35 cc. of a 1.55 N solution of butyl lithium in hexane. After cooling, to −30° C., 5.3 gm. of (2′,2′-dimethyl-1′,3′-dioxolane)-methyl 5-oxo-8-chloro-10,11-dihydro-5H-dibenzo/a,d/cycloheptene-3-acetate (obtained according to Example IX) in solution in 9.7 cc. of tetrahydrofuran and 9.7 cc. of hexamethylphosphorotriamide were added to the above mixture. The reaction mixture was cooled to −30° C., agitated for 10 minutes and then 2.2 cc. of methyl iodide were added. The mixture was again cooled to −30° C. and agitated for 50 minutes while allowing the mixture to return to ambient temperature. The reaction mixture was then poured into water and the aqueous phases were extracted with ether. The ethereal phases were washed with water, dried over magnesium sulfate, filtered and distilled to dryness under reduced pressure.

The residue was purified by chromatography through silica gel with elution with a (9:1) mixture of benzene and ethyl acetate, 4 gm. of (2′,2′-dimethyl-1′,3′-dioxolane)-methyl 5-oxo-8-chloro-10,11-dihydro-5H-dibenzo/a,d/cycloheptene-3-α-methylacetate were obtained and utilized as such in the following step.

Step B: dl-5-oxo-8-chloro-10,11-dihydro-5H-dibenzo/a,d/cycloheptene-3-α-methylacetic acid 4 gm. of the acetonide ester obtained in Step A were introduced into a solution of 40 cc. of ethanol, 4 cc. of water and 4 cc. of sodium hydroxide solution. The suspension obtained was heated to reflux for 1 hour, allowed to cool, water was added and it was extracted with ether. Then, the mother liquors were acidified with concentrated hydrochloric acid. The precipitate was extracted with ether. The ethereal phases were washed with water, dried over magnesium sulfate and distilled to dryness under reduced pressure.

The residue was recrystallized from isopropyl ether and 1.35 gm. of dl-5-oxo-8-chloro-10,11-dihydro-5H-dibenzo/a,d/cycloheptene-3-α-methylacetic acid were obtained in the form of a yellow amorphous product, soluble in ether, methylene chloride and dilute sodium hydroxide solution.

*Analysis.*—$C_{18}H_{15}ClO_3$; molecular weight=31.473. Calculated (percent): C, 68.68; H, 4.80; Cl, 11.26. Found (percent): C, 68.5; H, 4.8; Cl, 11.4.

I.R. spectra (chloroform):

Presence of acid C=O at 1739 and 1703$cm.^{-1}$
Presence of conjugated ketone at 1649 and 1639$cm.^{-1}$
Presence of aromatic ring at 1597, 1580, 1560 and 1497$cm.^{-1}$ U.V. spectra (ethanol):

Max. at 275 nm., $E^{1\%}_{1cm.}$=506 or $\epsilon$=15900

EXAMPLE XII

10-Oxo-4,5-Dihydro-Benzo/4.5/Cyclohepta/2,1b/Thiophene-2-Carboxylis Acid

Step A: Diethyl 4-(2-ethoxycarbonyl)-thienyl-phosphonate 40 gm. of 2-ethoxycarbonyl-4-bromo-methyl-thiophene (obtained according to the process described by Gogte et al., Tetrahedron, 1967, 23, 2443–2451) were heated to 140° C., and over 20 minutes 29.5 cc. of triethyl phosphite was added thereto. The temperature was maintained at 160° C. for 2 hours. Thereafter the mixture was distilled under vacuum and 35.3 gm. of diethyl 4-(2-ethoxycarbonyl)-thienyl-phosphonate was obtained in the form of a colorless liquid boiling at 170° to 172° C. under 1.2 mm. of mercury and soluble in chloroform and ethanol.

*Analysis.*—$C_{12}H_{19}O_5PS$; molecular weight=306.36. Calculated (percent): P, 10.12. Found (percent): P, 9.9.

I.R. spectra (chloroform): Presence of ester C=O at 1701$cm.^{-1}$ and of P→O and of P—O—C U.V. spectra (ethanol):

Max. at 247–248 nm., $\epsilon$=10100
Max. at 276 nm., $\epsilon$=6100

Step B: Trans-4-[β-(2′-carboxyphenyl)-vinyl]-thiophene-2-carboxylic acid 25 gm. of sodium methylate were placed in suspension in 90 cc. of dimethylformamide cooled to −10° C. A solution of 34.5 gm. of diethyl 4-(2-ethoxycarbonyl)-thienyl-phosphonate and 17.4 gm. of 2-formyl-benzoic acid in 90 cc. of dimethylformamide was added thereto. The mixture was brought to room temperature and agitated for another 20 minutes, then poured into a mixture of ice and water. The aqueous phase was extracted with benzene and thereafter brought to a pH of 4 by the addition of 25 cc. of concentrated hydrochloric acid, while cooling. The mixture was agitated for 10 minutes while icing. The precipitate was vacuum filtered, washed with an aqueous hydrochloric acid solution (pH=4), and dried at 70° C. under vacuum. 25.5 gm. of a raw product were obtained.

By recrystallization of 1.4 gm. of the raw product in methylethylketone, 750 mg. of trans-4-[β-(2′-carboxyphenyl)-vinyl]-thiophene-2-carboxylic acid were obtained in the form of colorless crystals melting at 243° C. and soluble in ethanol and acetone, slightly soluble in benzene and chloroform and insoluble in water.

*Analysis.*—$C_{14}H_{10}O_4S$; molecular weight=274.28. Calculated (percent): C, 61.31; H, 3.67; S, 11.69. Found (percent): C, 61.6; H, 3.8; S, 11.6.

I.R. spectra (Nujol): Presence of C=O at 1678$cm.^{-1}$, of aromatic ring and C=C at 1592, 1566 and 1534$cm.^{-1}$, and of OH.

U.V. spectra (ethanol):

Max. at 220 nm., $\epsilon$=17300
Max. at 242 nm., $\epsilon$=20000
Max. at 291 nm., $\epsilon$=22100

Step C: 4-[β-(2′-carboxylphenyl)-ethyl]-thiophene-2 carboxylic acid 25 gm. of trans-4-[β-(2′-carboxyphenyl)-vinyl]-thiophene-2-carboxylic acid were dissolved in 380 cc. of acetic acid. 50 gm. of red phosphorus and 250 cc. of a 57% hydroiodic acid solution were added and the mixture was heated to 110° C. for 1 hour. The mixture was filtered while hot. The filter cake was washed with acetic acid. The combined filtrate and wash liquors were cooled and poured into iced water. The precipitate was vacuum filtered, washed with water and dried at 70° C. under vacuum. 21.2 gm. of raw product were obtained.

By recrystallization of 350 mg. of the raw product from chloroform, 250 mg. of 4-[β-(2'-carboxyphenyl)ethyl]-thiophene-2-carboxylic acid were obtained in the form of colorless crystals melting at 178° C. and soluble in ethanol and acetone, slightly soluble in chloroform and insoluble in water.

*Analysis.*—$C_{14}H_{12}O_4S$; molecular weight=276.30. Calculated (percent): C, 60.85; H, 4.38; S, 11.60. Found (percent): C, 60.7; H, 4.3; S, 11.6.

U.V. spectra (ethanol):

Infl. towards 231–232 nm., $E_{1cm.}^{1\%}=475$

Max. at 239 nm., $E_{1cm.}^{1\%}=495$ or $\epsilon=13600$

Infl. towards 245 nm., $E_{1cm.}^{1\%}=459$

Max. at 278 nm., $E_{1cm.}^{1\%}=263$ or $\epsilon=7300$

Step D: 10-oxo-4,5-dihydro-benzo/4,5/cyclohepta/2,1b/thiophene-2-carboxylic acid A mixture of 21 gm. of 4[β-(2'-carboxyphenyl)-ethyl]-thiophene-2-carboxylic acid and 210 gm. of polyphosphoric acid were heated to 115° C. for 1½ hours under agitation. The mixture was then poured into a water-ice mixture and extracted with ethyl acetate. The organic phases were washed with water, dried over magnesium sulfate and the solvent was distilled. The residue was triturated with 20 cc. of ethyl acetate and vacuum filtered. The precipitate was rinsed with iced ethyl acetate and dried.

11 gm. of 10-oxo-4,5-dihydro-benzo/4,5/cyclohepta/2,1b/thiophene-2-carboxylic acid were obtained in the form of pale yellow crystals melting at 270° C. and soluble in ethyl acetate, slightly soluble in ethanol, acetone and benzene and insoluble in water.

*Analysis.*—$C_{14}H_{10}O_3S$; molecular weight=258.28. Calculated (percent): C, 65.10; H, 3.90; S, 12.41. Found (percent): C, 65.4; H, 4.1; S, 12.6.

I.R. spectra (Nujol): Presence of acid C=O at 1668$^{cm.-1}$, of conjugated C=O at 1619$^{cm.-1}$, of C=C and aromatic ring at 1590 and 1538 $^{cm.-1}$ and of OH.

U.V. spectra (ethanol):

Infl. towards 230 nm., $E_{1cm.}^{1\%}=195$

Max. at 309 nm., $E_{1cm.}^{1\%}=659$ or $\epsilon=17000$

EXAMPLE XIII (2',2'-Dimethyl-1',3'-Dioxolane)-Methyl 10-Oxo-4,5-Dihydro-Benzo/4,5/Cyclohepta/2,1b/Thiophene-2-Acetate Step A: 10-oxo-4,5-dihydro-benzo/4,5/cyclohepta/2,1b/thiophene-2-carboxylic acid chloride 6 gm. of 10-oxo-4,5-dihydro-benzo/4,5/cyclohepta/2,1b/thiophene-2-carboxylic acid were introduced into 50 cc. of thionyl chloride under an inert atmosphere. The reaction mixture was heated to reflux and maintained under reflux for 1 hour, cooled and the volatile fractions were eliminated by distillation under reduced pressure. 6.4 gm. of 10-oxo-4,5-dihydro-benzo/4,5/cyclohepta/2,1b/thiophene-2-carboxylic acid chloride were obtained melting at 123° C.–125° C.

I.R. spectra (chloroform):

Presence of C=O at 1748 and 1703$^{cm.-1}$
Presence of conjugated C=O at 1630$^{cm.-1}$
Presence of C=C and aromatic ring at 1598, 1576 and 1536$^{cm.-1}$ U.V. spectra (ethanol):

Infl. towards 230 nm., $E_{1cm.}^{1\%}=186$

Max. at 307 nm., $E_{1cm.}^{1\%}=631$ or $\epsilon=17500$

Step B: 10-oxo-4,5-dihydro-benzo/4,5/cyclohepta/2,1b/thiophene-2-diazomethylketone 6.4 gm. of the acid chloride obtained in Step A in solution in 60° C. of methylene chloride were introduced over a period of 30 minutes under an inert atmosphere into 180 cc. of a solution containing 18 gm./liter of diazomethane in methylene chloride, cooled to +5° C. The mixture was agitated for 50 minutes at +5° C. and then concentrated to dryness by distillation under reduced pressure. The residue was triturated with ether. The precipitate was isolated by vacuum filtering, washed and dried.

6.25 gm. of 10-oxo-4,5-dihydro-benzo/4,5-cyclohepta/2,1b/thiophene-2-diazomethylketone were obtained melting at 200° C. A sample of this product was crystallized from a mixture of ethyl acetate and acetone and melted at 206° C.

I.R. spectra (chloroform): Presence of bands at 2109$^{cm.-1}$ characteristic of diazoketone, of conjugated ketone at 1626 and 1600 $^{cm.-1}$ and of C=C and aromatic ring at 1539$^{cm.-1}$.

Step C: (2',2'-dimethyl-1',3'-dioxolane)-methyl 10-oxo-4,5-dihydro-benzo/4,5/cyclohepta/2,1b/thiophene-2-acetate 2.5 gm. of 10-oxo-4,5-dihydro-benzo/4,5/cyclohepta/2,1b/thiophene-2-diazomethylketone were introduced into a mixture of 12.5 cc. of glycerol acetonide and 12.5 cc. of γ-collidine. The balloon flask containing the reaction mixture was plunged into a bath at 170° C. and the evolution of nitrogen was measured. The mixture was cooled and concentrated to dryness by distillation under reduced pressure. The residue was purified by chromatography through silica gel and elution with a (9:1) mixture of benzene and ethyl acetate. 2.12 gm. of (2',2'-dimethyl-1',3'-dioxolane)-methyl 10-oxo - 4,5 - dihydro-benzo/4,5/cyclohepta/2,1b/thiophene-2-acetate were obtained.

I.R. spectra (chloroform): Presence of bands at 1745$^{cm.-1}$ characteristic of unconjugated ester, at 1621$^{cm.-1}$ characteristic of conjugated ketone, at 1595 and 1573$^{cm.-1}$ characteristic of C=C and aromatic ring.

U.V. spectra (ethanol):

Infl. towards 275 nm., $E_{1cm.}^{1\%}=199$

Infl. towards 305 nm., $E_{1cm.}^{1\%}=307$

Max. at 320 nm., $E_{1cm.}^{1\%}=340$ or $\epsilon=13100$

EXAMPLE XIV

10-Oxo-4,5-Dihydro-Benzo/4,5/Cyclohepta/2,1b/Thiophene-2-Acetic acid 2.4 gm. of (2',2'-dimethyl-1',3'-dioxolane)-methyl 10-oxo - 4,5 - dihydro-benzo/4,5/cyclohepta/2,1b/thiophene-2-acetate were introduced into a mixture of 50 cc. of methanol and 25 cc. of an aqueous 2 N sodium hydroxide solution. The mixture was agitated for 30 minutes at 20° C. and the methanol was eliminated by distillation under reduced pressure. The aqueous phase was washed with ethyl acetate and acidified by the addition of concentrated hydrochloric acid. The acidic aqueous phases were extracted with ethyl acetate. The organic extracts were washed with water, dried over magnesium silicate and the solvent was eliminated by distillation under reduced pressure. The residue was triturated with isopropyl ether. The resultant precipitate was isolated by vacuum filtration, washed, and dried.

1.35 gm. of 10-oxo-4,5-dihydro-benzo/4,5/cyclohepta/2,1b/thiophene-2-acetic acid was obtained melting at 148° C.

I.R. spectra (chloroform): Presence of bands at 1720$^{cm.-1}$ characteristic of acid C=O, at 1623$^{cm.-1}$ characteristic of conjugated ketone, at 1596 and 1576$^{cm.-1}$ characteristic of C=C and aromatic ring.

U.V. spectra (ethanol):

Infl. towards 223 nm., $E^{1\%}_{1cm.}=183$

Infl. towards 275 nm., $E^{1\%}_{1cm.}=279$

Max. at 321 nm., $E^{1\%}_{1cm.}=496$

Infl. towards 413 nm., $E^{1\%}_{1cm.}=3$

EXAMPLE XV (2',2' - Dimethyl - 1',3' - Dioxolane)-Methyl 10-Oxo-4,5-Dihydrobenzo/4,5/Cyclohepta/2,1b/Thiophene - 2 - α-Methylacetate Step A: 10-oxo-4,5-dihydro-benzo/4,5/cyclohepta/2,1b/thiophene-2-(α-diazoethylketone)

A solution of 1.5 gm. of 10-oxo-4,5-dihydro-benzo/4,5/cyclohepta/2,1b/thiophene-2-carboxylic acid chloride in 30 cc. of methylene chloride was introduced over a period of 10 minutes into 275 cc. of an ethereal solution containing 4.5 gm./liter of diazoethane, cooled to 0° C. The mixture was agitated for another 30 minutes at 0° C., then concentrated to dryness by distillation under reduced pressure. The residue was purified by chromatography through silica gel with elution with a (9:1) mixture of benzene and ethyl acetate.

0.75 gm. of 10-oxo-4,5-dihydro-benzo/4,5/cyclohepta/2,1b/thiophene-2-(α-diazoethylketone) was obtained melting at 135° C.

I.R. spectra (chloroform): Presence of bands at 1627, 1595 and 1539$^{cm.-1}$ in the C=O+C=C+aromatic ring region and at 2067$^{cm.-1}$ corresponding to the diazoketone.

Step B: (2',2'-dimethyl-1',3'-dioxolane)-methyl 10 - oxo-4,5-dihydro-benzo/4,5/cyclohepta/2,1b/thiophene - 2 - α-methyl acetate 0.750 gm. of 10-oxo-4,5-dihydro-benzo/4,5/cyclohepta/2,1b/thiophene-2-(α-diazoethyl-ketone) were introduced into 20 cc. of the acetonide of glycerol. The ballon flask containing the reaction mixture was plunged into a bath at 170° C. and the evolution of nitrogen was measured. Thereafter the reaction mixture was concentrated to dryness by distillation under reduced pressure. The residue was purified by chromatography through silica gel with elution with a (9:1) mixture of benzene and ethyl acetate.

0.375 gm. of (2',2'-dimethyl - 1',3' - dioxolane)-methyl 10-oxo - 4,5 - dihydro - benzo/4,5/cyclohepta/2,1b/thiophene-2-α-methylacetate were obtained.

I.R. spectra (chloroform): Presence of bands at 1733$^{cm.-1}$ characteristic of ester carbonyl, at 1622$^{cm.-1}$ characteristic of conjugated carbonyl, at 1585$^{cm.-1}$ characteristic of C=C and aromatic ring.

U.V. spectra (ethanol):

Infl. towards 227 nm., $E^{1\%}_{1cm.}=105$

Infl. towards 275–276 nm., $E^{1\%}_{1cm.}=183$

Max. at 318 nm., $E^{1\%}_{1cm.}=319$ or $\epsilon=13000$

EXAMPLE XVI

10-Oxo-4,5-Dihydro-Benzo/4,5/Cyclohepta/2,1b/Thiophene-2-α-Methylacetic acid 0.165 gm. of (2',2'-dimethyl - 1',3' - dioxolane)-methyl 10-oxo - 4,5 - dihydro-benzo/4,5/cyclohepta/2,1b/thiophene-2-α-methylacetate were introduced under an inert atmosphere into a mixture of 3 cc. of dioxane and 0.6 cc. of an aqueous 6 N solution of hydrochloric acid. The mixture was agitated for 96 hours at ambient temperature then diluted with water and neutralized to a pH of 7 by addition of a saturated aqueous solution of sodium bicarbonate. The aqueous phase was extracted with ethyl acetate. The organic extracts were washed with water, dried and concentrated to dryness. 0.054 gm. of a neutral fraction containing the starting acetonide of the glyceryl ester were thus isolated.

The neutral aqueous phase, after extraction, was acidified to a pH of 2 by the addition of concentrated hydrochloric acid and extracted with ethyl acetate. The organic phases were washed with water, dried and concentrated to dryness by distillation under reduced pressure.

0.057 gm. of 10-oxo - 4,5 - dihydro-benzo/4,5/cyclohepta/2,1b/thiophene - 2 - α - methylacetic acid were obtained.

I.R. spectra (chloroform): Presence of bands at 1706$^{cm.-1}$ characteristic of acid carbonyl, at 1615$^{cm.-1}$ characteristic of conjugated carbonyl, at 1582 and 1505$^{cm.-1}$ characteristic of C=C and aromatic ring.

U.V. spectra (ethanol):

Infl. towards 225 nm., $E^{1\%}_{1cm.}=149$

Max. at 273 nm., $E^{1\%}_{1cm.}=225$

Infl. towards 302 nm., $E^{1\%}_{1cm.}=335$

Max. at 322 nm., $E^{1\%}_{1cm.}=409$

EXAMPLE XVII

12-Oxo-5,6,7,712-Tetrahydro-dibenzo/a,d/Cyclooctene-2-Acetic Acid

Step A: 2-cyano-12-oxo-5,6,7,12-tetrahydro-dibenzo/a,b/cyclooctene

A suspension of 300 mg. of 2-bromo-12-oxo-5,6,7,12-tetrahydro-dibenzo/a,d/cyclooctene and 200 mg. of copper cyanide in 9 cc. of anhydrous quinoline was heated to reflux for 5 hours. The mixture was then cooled, poured into 13 cc. of N-hydrochloric acid solution and extracted with ether. The ethereal phases were washed with N hydrochloric acid solution, then with water, dried over magnesium sulfate, filtered and distilled to dryness under reduced pressure. The residue was purified by chromatography through magnesium silicate with elution with ether.

After evaporation of the solvent, 150 mg. of 2-cyano-12-oxo-5,6,7,12-tetrahydro-dibenzo/a,d/cyclooctene were obtained in the form of white crystals melting at 173° C. and soluble in methylene chloride, methanol and ether.

*Analysis.*—$C_{17}H_{13}NO$; molecular weight=247.28. Calculated (percent): C, 82.57; H, 5.30; N, 5.66. Found (percent): C, 82.8; H, 5.7; N, 5.7.

I.R. spectra (chloroform):

Presence of conjugated C≡N at 2232$^{cm.-1}$

Presence of C=O at 1642$^{cm.-1}$

U.V. spectra (ethanol):

Max. at 227 nm., $E^{1\%}_{1cm.}=1341$ or $\epsilon=33100$

Max. at 260 nm., $E^{1\%}_{1cm.}=567$ or $\epsilon=14000$

Infl. towards 300 nm., $E^{1\%}_{1cm.}=126$

Infl. towards 344 nm., $E^{1\%}_{1cm.}=7$

Infl. towards 356 nm., $E^{1\%}_{1cm.}=6$

Step B: 12-oxo-5,6,7,12-tetrahydro-dibenzo/a,d/cyclooctene-2-carboxylic acid 5.5 gm. of 2-cyano-12-oxo-5,6,7,12-tetrahydro-dibenzo/a,d/cyclooctene were introduced under agitation and nitrogen into 55 cm. of a solution composed of

|  | Cc. |
|---|---|
| Water | 100 |
| Concentrated acetic acid | 100 |
| Concentrated sulfuric acid | 100 |

This suspension was heated to reflux for 3 hours, cooled, poured into water and extracted with ether. The organic phases were washed with N sodium hydroxide solution. The alkaline mother liquors were acidified by hydrochloric acid. The precipitate formed was extracted with methylene chloride. The organic phases were washed with water, dried over magnesium sulfate, filtered and distilled to dryness under reduced pressure. The residue was washed with ether.

5.6 gm. of 12-oxo-5,6,7,12-tetrahydro-dibenzo/a,b/cyclooctene-2-carboxylic acid were thus obtained in the form of white crystals melting at 260° C. and soluble in dilute sodium hydroxide, methanol, ether and methylene chloride. For analysis, the product was recrystallized from chloroform, M.P.=264° C.

*Analysis.*—$C_{17}H_{14}O_3$; molecular weight=266.28. Calculated (percent): C, 76.67; H, 5.30. Found (percent): C, 76.8; H, 5.5.

I.R. spectra (Nujol):

Presence of conjungated ketone at $1637^{cm.-1}$
Presence of acid carbonyl at $1689^{cm.-1}$
Presence of aromatic ring at 1601 and $1567^{cm.-1}$ U.V. spectra (ethanol):

Max. at 230 nm., $E_{1\,cm.}^{1\%}=989$ or $\epsilon=26300$

Max. at 264 nm. $E_{1\,cm.}^{1\%}=600$ or $\epsilon=16000$

Infl. towards 298 nm., $E_{1\,cm.}^{1\%}=123$

Max. at 340 nm., $E_{1\,cm.}^{1\%}=7$

Infl. towards 351 nm., $E_{1\,cm.}^{1\%}=6$

Infl. towards 366 nm., $E_{1\,cm.}^{1\%}=4$

Step C: 12-oxo-5,6,7,12-tetrahydro-dibenzo/a,d/cyclooctene-2-acetic acid (1) Preparation of the acid chloride.—6 gm. of 12-oxo - 5,6,7,12 - tetrahydro - dibenzo/a,d/cyclooctene - 2-carboxylic acid in 60 cc. of thionyl chloride were agitated for 1 hour at reflux. Then the thionyl chloride was distilled under reduced pressure. 60 cc. of benzene was added and the mixture was distilled to dryness under reduced pressure. 12-oxo-5,6,7,12-tetrahydro-dibenzo/a,b/cyclooctene-2-carboxylic acid chloride was obtained.

(2) Preparation of the diazoketone.—The acid chloride obtained above was dissolved in methylene chloride and 600 cc. of a solution of diazomethane in methylene chloride, testing 11 gm./liter were added at $+3°$ C. The reaction mixture was allowed to stand for 1 hour at ambient temperature and then distilled to dryness under reduced pressure. The residue was washed with ether, 6 gm. of the diazoketone was obtained melting at 146° C. (with decomposition).

(3) Decomposition of the diazoketone.—990 mg. of silver oxide, 1.8 gm. of sodium carbonate and 1.3 gm. of sodium thiosulfate were placed in suspension in 30 cc. of water. The suspension was heated to 60° C. and, under agitation, a solution of 3 gm. of the diazoketone obtained above in 30 cc. of dioxane was added thereto. The mixture was agitated for 2½ hours at 60° C. while adding during this period 600 mg. of silver oxide. The mixture was then filtered hot and the filter cake was rinsed with methylene chloride. The filt-rates were washed with a N sodium hydroxide solution. The alkaline mother liquors were acidified by the addition of concentrated hydrochloric acid and extracted with ether. The combined organic phases were dried over magnesium sulfate, filtered and distilled to dryness under reduced pressure. The residue was taken up with 2 cc. of ether and vacuum filtered.

1.8 gm. of 12-oxo-5,6,7,12-tetrahydro-dibenzo/a,d/cyclooctene-2-acetic acid were obtained in the form of white crystals melting at 200° C. and soluble in dilute sodium hydroxide, methanol and ether.

*Analysis.*—$C_{18}H_{16}O_3$; molecular weight=280.31. Calculated (percent): C, 77.12; H, 5.75. Found (percent): C, 77.4; H, 6.1.

I.R. spectra (Nujol):

Presence of acid C=O at $1712^{cm.-1}$
Presence of conjugated ketone at $1631^{cm.-1}$
Presence of aromatic ring at 1605 and $1589^{cm.-1}$ U.V. spectra (ethanol):

Max. at 265 nm., $E_{1\,cm.}^{1\%}=582$ or $\epsilon=16300$

Infl. towards 300 nm. $E_{1\,cm.}^{1\%}=124$

Infl. towards 353 nm., $E_{1\,cm.}^{1\%}=6$

Infl. towards 370 nm., $E_{1\,cm.}^{1\%}=3$

The 2-bromo-12-oxo - 5,6,7,12 - tetrahydro-dibenzo/a,d/cyclooctene, utilized as starting material for the above synthesis, can be prepared in the following manner.

(1) 3-phenethyl - 6 - bromo-isobenzofuran - 1 - one—Preparation of the magnesium compound: 65 gm. of magnesium turnings were introduced under agitation in 250 cc. of ether. Then, a solution of 450 gm. of β-phenethyl bromide in 1500 cc. of ether was added dropwise. The reaction mixture was heated to reflux for 2 hours, then cooled.

Preparation of 3 - phenethyl - 6 - bromo-isobenzofuran-1-one: 25 gm. of 5-bromo - 2 - formyl-benzoic acid (prepared according to the method described in French Medical Patent (BSM) No. 4,344 M) were placed in suspension, under nitrogen, in 1250 cc. of ether. The suspension was cooled to 0° C. and 440 cc. of the magnesium compound solution prepared above was added dropwise. The reaction mixture was then agitated for 2 hours at ambient temperature and poured into ice containing concentrated hydrochloric acid. The aqueous phase was extracted with ether. The ethereal phases were dried over magnesium sulfate, filtered and distilled to dryness under reduced pressure. The residue was purified by recrystallization from petroleum ether (B.P. 40°–75° C.).

24 gm. of 3-phenethyl - 6 - bromo-isobenzofuran-1-one were obtained in the form of white crystals melting at 100° C. and soluble in methylene chloride, ether and ethanol.

*Analysis.*—$C_{16}H_{13}BrO_2$; molecular weight=317.18. Calculated (percent): C, 60.58; H, 4.13; Br, 25.20. Found (percent): C, 60.6; H, 4.2; Br, 24.9.

(2) 2-(γ-phenylpropyl) - 5 - bromo-benzoic acid.—A suspension of 18.9 gm. of 3-phenethyl - 6 - bromo-isobenzofuran-1-one, 84 cc. of hydroiodic acid and 10.6 gm. of red phosphorus were agitated for 18 hours at 140° C. The reaction mixture was then cooled and poured into iced water. The mixture was vacuum filtered, rinsed with water, then the insoluble was dissolved at reflux by 200 cc. of concentrated ammonia. The mixture was filtered and the filtrate was acidified with concentrated hydrochloric acid. The acidified aqueous phase was extracted with methylene chloride. The organic phases were washed with water, dried over magnesium sulfate, filtered and distilled to dryness under reduced pressure. The residue was recrystallized from pentane.

2-(γ-phenylpropyl) - 5 - bromo-benzoic acid was obtained with a yield of 80%. The product occurred in the form of white crystals melting at 93° C. and soluble in methylene chloride, ether and dilute sodium hydroxide.

*Analysis.*—$C_{16}H_{15}BrO_2$; molecular weight=319.19. Calculated (percent): C, 60.20; H, 4.74; Br, 25.04. Found (percent): C, 59.9; H, 4.9; Br, 24.71.

(3) 2-bromo - 12 - oxo - 5,6,7,12 - tetrahydro-dibenzo/a,d/cyclooctene.—A suspension of 14.5 gm. of 2-(γ-phenylpropyl) - 5 - bromobenzoic acid and 145 gm. of polyphosphoric acid was heated to 170° C. under agitation. The mixture was cooled to about 30° C. and poured into water. The aqueous mixture was extracted with ether. The ethereal phases were washed with N sodium hydroxide solution, dried over magnesium sulfate, filtered and distilled to dryness under reduced pressure. The residue was purified by recrystallization from pentane.

2-bromo - 12 - oxo - 5,6,7,12 - tetrahydro-dibenzo/a,d/cyclooctene was obtained with a yield of 85%. The product occurred in the form of yellow crystals melting at 88° C. and soluble in methylene chloride and ether and slightly soluble in pentane.

*Analysis.*—$C_{16}H_{13}BrO$; molecular weight=301.18. Calculated (percent): C, 63.80; H, 4.35; Br, 26.54. Found (percent): C, 63.8; H, 4.3; Br, 26.4.

EXAMPLE XVIII

Pharmacological Studies (1) Anti-inflammatory effect

The test employed was that of Branceni et al., slightly modified (Arch. Int. Pharmacodyn. 1954, 152, 15). This test consisted of administering to rats weighing about 150 gm., in a single injection, 1 mg. of naphthoylheparamine (N.H.A.) under the plantary pad of a rear paw. This injection provokes the formation of an inflammatory edema. The products to be studied are administered orally in aqueous suspension one hour before the irritant injection.

The inflammation is determined by plethysmometry. With the aid of an electric plethylsomometer, the volume of the paw is measured immediately before and 2 hours after the irritant injection. The increase of the volume of the paw between the two measurements represents the degree of inflammation. The average degree of inflammation of each group is expressed in absolute values and as a percentage of that of the control animals.

In these conditions, the standard active dose most adequate in order to calculate the activity of a product is that of DA 40, or the dose which diminishes the degree of inflammation by 40% with reference to that of the controls.

5-oxo - 10,11 - dihydro - 5H - dibenzo/a,d/cycloheptene - 3 - acetic acid (A), in aqueous suspension, was administered at doses of 10, 15 and 20 mg./kg. 5-oxo-10,11-dihydro - 5H - dibenzo/a,d/cycloheptene - 3 - α-methylacetic acid (B), in aqueous suspension, was administered at doses of 1,2 and 5 mg./kg.

The results obtained are given in the following Tables I and II.

TABLE I 5-oxo-10,11-dihydro-5H-dibenzo/a, d/cycloheptene-3-acetic-acid (A)

| Lot | Dose administered, mg./kg. | Increase of volume of the paw at hour 2 | Percent of protection |
|---|---|---|---|
| Control | 0 | 14.0 | |
| Product studied | 20 | 5.3 | 66 |
| Control | 0 | 21.5 | |
| Product studied | 15 | 8.6 | 60 |
| Control | 0 | 14.4 | |
| Product studied | 10 | 5.6 | 61 |

TABLE II 5-oxo-10,11-dihydro-5H-dibenzo/a, d/cycloheptene-3-A-methylacetic acid (B)

| Lot | Dose administered, mg./kg. | Increase of volume of the paw at hour 2 | Percent of protection |
|---|---|---|---|
| Control | 0 | 18.1 | |
| Product studied | 5 | 4.1 | 77 |
| Control | 0 | 17.8 | |
| Product studied | 1 | 17.9 | 0 |
|  | 2 | 12.0 | 33 |

According to these results, the two products studied had an important anti-inflammatory activity. The DA 40 of 5-oxo - 10,11 - dihydro - 5H - dibenzo/a,d/cycloheptene-3 - α - methylacetic acid (B) was about 2.5 mg./kg. and that of 5-oxo - 10,11 - dihydro - 5H - dibenzo/a,d/cycloheptene-3-acetic acid (A) was about 9 mg./kg.

Under these same conditions, the DA 40 of aspirin is from 30 to 60 mg./kg.

(2) Analgesic effect

The test employed is based on the fact noted by Koster et al. (Fed. Proc. 1959, 18, 412) that the intraperitoneal injection in mice of acetic acid provokes repeated characteristic movements of stretching and contraction which can persist for more than 6 hours. Analgesics prevent or suppress this syndrome which, from this, can be considered as the externalization of a diffuse abdominal pain.

A solution of 6 parts per thousand of acetic acid in water containing 10% of gum arabic is employed. The dose releasing the syndrome under these conditions is 0.01 cc./gm., or 60 mg./kg. of acetic acid. The analgesics are administered orally in aqueous suspension ½ hour before the intraperitoneal injection of acetic acid. The mice were starved for 15 hours before the test. One or several groups of 5 animals are utilized for each dose and for the controls which are obligatory for each test. The stretching are observed and counted for each mouse, then added by the groups of 5, for a period of observation of 15 minutes commencing immediately after the injection of acetic acid.

5-oxo-10,11-dihydro - 5H - dibenzo/a,d/cycloheptene-3-acetic acid (A) was administered in doses of 20, 50, 100 and 200 mg./kg. 5-oxo-10,11-dihydro-5H-dibenzo/a,d/cycloheptene-3-α-methylacetic acid (B) was administered in doses of 10, 20, 50 and 100 mg./kg. The results are given in Table III.

TABLE III

| Product: | Dose administered in mg./kg. | Percent protection |
|---|---|---|
| B | 10 | 51 |
|  | 20 | 54 |
|  | 50 | 55 |
|  | 100 | 82 |
| A | 20 | 37 |
|  | 50 | 63 |
|  | 100 | 62 |
|  | 200 | 61 |

Under the conditions of the experiment, the 50% active dose (DA 50) was 35 mg./kg. for 5-oxo-10,11-dihydro-5H-dibenzo/a,d/cycloheptene-3-acetic acid (A) and 30 mg./kg. for 5-oxo-10,11-dihydro-5H-dibenzo/a,d/cycloheptane-3-α-methylacetic acid (B). Under the same conditions the DA 50 for aspirin is some 160 mg./kg.

(3) Determination of ulcerigenic activity

The ulcerigenic activity was determined according to a test inspired by Boissier et al., Ther. 1967, 22, 157.

Female rats weighing 120 to 140 gm. are starved for 24 hours before the start of the tests. The product studied is administered orally in aqueous suspension in a solution of carboxymethylcellulose containing "Tween 80," in a volume of 0.4 cc. per 100 gm. of animal and at different doses. The animals are sacrificed 7 hours after the treatment or 31 hours after the onset of starvation and the stomachs are separated.

The importance of the ulcerous lesions is evaluated on each stomach, taking into account their number and their dimensions. Under these experimental conditions, 5-oxo-10,11-dihydro-5H-dibenzo/a,d/cycloheptene-3-acetic acid (A) provoked a degree of average ulcers at a dose in excess of 200 mg./kg. and 5-oxo-10,11-dihydro-5H-dibenzo/a,d/cycloheptene-3-α-methylacetic acid (B), at a dose of 60 mg./kg. In the same conditions, indomethacine provokes average ulcers at a dose of 11 mg./kg.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. A tricyclic ketonic compound having the formula

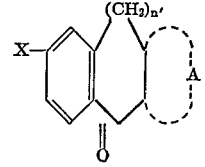

wherein X represents a member selected from the group consisting of hydrogen, halogen and trihalomethyl, $n'$ is an integer from 2 to 3, and A represents the remainder of a ring system selected from the group consisting of benzene, when $n'$ is 2 or 3, and thiophene having its sulfur in position $\alpha$ to the carbon atom attached to the ketone carbon atom, when $n'$ is 2, said remainder of a ring system being substituted in position $\beta$ to the carbon atom attached to the ketone carbon atom by an alkanoic substituent having the formula

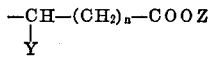

wherein Y represents a member selected from the group consisting of hydrogen and alkyl having 1 to 3 carbon atoms, $n$ is an integer from 0 to 2 and Z represents a member selected from the group consisting of hydrogen, alkali metal, alkali earth metal, ammonium, lower alkyl, 2,3-dihydroxy-propyl and (2',2'-dimethyl - 1',3' - dioxolane)-methyl.

2. The compound of claim 1 wherein A is the remainder of a benzene ring having the formula

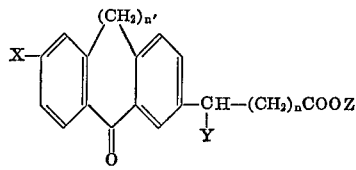

wherein X, Y, Z, $n'$ and $n$ have the values defined in claim 1.

3. The compound of claim 2 wherein $n'$ is 2.

4. The compound of claim 1 wherein A is the remainder of a thiophene ring and $n'$ is 2 having the formula

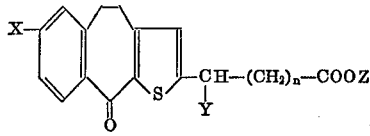

wherein X, Y, Z and $n$ have the values defined in claim 1.

5. The compound of claim 1 being 5-oxo-10,11-dihydro-5H-dibenzo/a,d/cycloheptene-3-acetic acid.

6. The compound of claim 1 being 5-oxo-10,11-dihydro - 5H - dibenzo/a,d/cycloheptene-3-$\alpha$-methylacetic acid.

7. The compound of claim 1 being (2',2'-dimethyl-1',3'-dioxolane)-methyl 5-oxo-10,11-dihydro-5H-dibenzo/a,d/cycloheptene-3-acetate.

8. The compound of claim 1 being 2',3'-dihydroxypropyl 5-oxo - 10,11 - dihydro - 5H - dibenzo/a,d/cycloheptene-3-acetate.

9. The compound of claim 1 being 5-oxo-8-chloro-10,11-dihydro - 5H - dibenzo/a,d/cycloheptene-3-acetic acid.

10. The compound of claim 1 being (2',2'-dimethyl-1',3' - dioxolane)-methyl 5-oxo-8-chloro-10,11-dihydro-5H-dibenzo/a,d/cycloheptene-3-acetate.

11. The compound of claim 1 being 10-oxo-4,5-dihydrobenzo/4,5/cyclohepta/2,1b/thiophene-2-acetic acid.

12. The compound of claim 1 being 10-oxo-4,5-dihydrobenzo/4,5/cyclohepta/2,1b/thiophene - 2 - $\alpha$ - methylacetic acid.

13. The compound of claim 1 being (2',2'-dimethyl-1',3'-dioxolane)-methyl 10-oxo-4,5 - dihydro-benzo/4,5/cyclohepta/2,1b/thiophene-2-acetate.

14. The compound of claim 1 being (2',2'-dimethyl-1',3'-dioxolane)-methyl 10 - oxo-4,5-dihydro-benzo/4,5/cyclohepta/2,1b/thiophene-2-$\alpha$-methylacetate.

15. The compound of claim 1 being methyl 5-oxo-10,11-dihydro - 5H - dibenzo/a,d/cycloheptene-3-$\alpha$-methylacetate.

16. The compound of claim 1 being methyl 5-oxo-10,11-dihydro - 5H - dibenzo/a,d/cycloheptene-3-acetate.

17. The compound of claim 1 being 2',3'-dihydroxypropyl 5-oxo-8-chloro-10,11-dihydro-5H-dibenzo/a,d/cycloheptene-3-acetate.

18. The compound of claim 1 being 5-oxo-8-chloro-10,11 - dihydro-5H-dibenzo/a,d/cycloheptene-3-$\alpha$-methylacetic acid.

19. The compound of claim 1 being 5-oxo-10,11-dihydro-5H-dibenzo/a,d/cycloheptene-3-n-butyric acid.

20. The compound of claim 1 being 12-oxo-5,6,7,12-tetrahydro-dibenzo/a,d/cyclooctene-2-acetic acid.

References Cited
UNITED STATES PATENTS

| | | | |
|---|---|---|---|
| 3,297,763 | 1/1967 | Slates et al. | 260—590 |
| 3,598,867 | 8/1971 | Fouche | 260—515 |

HENRY R. JILES, Primary Examiner

C. M. S. JAISLE, Assistant Examiner

U.S. Cl. X.R.

260—247.1, 247.2 B, 340.9, 469, 515 A, 515 R; 424—248, 275, 278, 308, 317

UNITED STATES PATENT OFFICE
CERTIFICATE OF CORRECTION

Patent No. 3,780,061            Dated December 18, 1973

Inventor(s)    Andre Allais et al.

It is certified that error appears in the above-identified patent and that said Letters Patent are hereby corrected as shown below:

After the inventors' names and addresses insert -- assignors to Roussel Uclaf, Paris, France --. Column 1, line 67, in the formula, "CCOZ" should read -- COOZ --. Column 3, line 6 in the formula, "-X" should read -- X- --. Column 5, line 41, "2,3" should read 2',3' --. Column 11, line 27, "-CH$_2$COOH" should read -- CH$_2$-COOH --. Column 12, line 6, "500 cc" should read -- 50 cc --. Column 15, line 11, "+5°C" should read -- $\pm$5°C --. Column 16, line 46, "a,b" should read -- a,d --. Column 20, line 15, "Carboxylis" should read -- Carboxylic --. Column 22, line 9, "60° C" should read -- 60 cc --. Column 24, line 24, "a,b" should read -- a,d --. Column 25, line 37, "a,b" should read -- a,d --. Column 27, line 51, "3-A" should read -- 3-α --.

Signed and sealed this 5th day of November 1974.

(SEAL)
Attest:

McCOY M. GIBSON JR.           C. MARSHALL DANN
Attesting Officer             Commissioner of Patents